(12) United States Patent
Kim et al.

(10) Patent No.: US 11,990,688 B2
(45) Date of Patent: May 21, 2024

(54) ANTENNA SYSTEM MOUNTED IN VEHICLE

(71) Applicant: LG ELECTRONICS INC., Seoul (KR)

(72) Inventors: Changil Kim, Seoul (KR); Seungwoo Ryu, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 141 days.

(21) Appl. No.: 17/780,013

(22) PCT Filed: Nov. 26, 2019

(86) PCT No.: PCT/KR2019/016323
§ 371 (c)(1),
(2) Date: May 25, 2022

(87) PCT Pub. No.: WO2021/107167
PCT Pub. Date: Jun. 3, 2021

(65) Prior Publication Data
US 2022/0416423 A1     Dec. 29, 2022

(51) Int. Cl.
*H01Q 1/32*     (2006.01)
*H01Q 1/36*     (2006.01)
(Continued)

(52) U.S. Cl.
CPC ........... *H01Q 5/307* (2015.01); *H01Q 1/3275* (2013.01); *H01Q 1/36* (2013.01); *H01Q 1/48* (2013.01);
(Continued)

(58) Field of Classification Search
CPC .......... H01Q 1/36; H01Q 1/48; H01Q 1/3275; H01Q 5/10; H01Q 5/25; H01Q 5/307; H01Q 5/378; H01Q 9/045; H01Q 21/28; H01Q 21/061
See application file for complete search history.

(56) References Cited

U.S. PATENT DOCUMENTS

| 7,337,528 B2 * | 3/2008 | Dunn | H01Q 9/0407 343/846 |
| 7,656,359 B2 * | 2/2010 | Haziza | H01Q 13/00 343/786 |

(Continued)

FOREIGN PATENT DOCUMENTS

| KR | 20080028613 | 4/2008 |
| KR | 20180011775 | 2/2018 |

(Continued)

OTHER PUBLICATIONS

PCT International Application No. PCT/KR2019/016323, International Search Report dated Aug. 21, 2020, 4 pages.

*Primary Examiner* — Tung X Le
(74) *Attorney, Agent, or Firm* — LEE, HONG, DEGERMAN, KANG & WAIMEY

(57) ABSTRACT

An antenna system mounted in a vehicle, according to the present invention, comprises: a radiator for transferring, through an upper opening, a signal which is applied through a lower opening; a coupling patch disposed on an upper substrate so as to be spaced apart from the upper opening by a predetermined interval so as to enable the coupling of the signal which has been transferred through the upper opening; and a first antenna connected to the coupling patch so as to make surface contact therewith, and comprising a shorting bar for connecting a ground layer of a lower substrate. The antenna system may further comprise, apart from the first antenna, a second antenna disposed in the antenna system.

18 Claims, 23 Drawing Sheets

(51) Int. Cl.
  *H01Q 1/48*    (2006.01)
  *H01Q 5/10*    (2015.01)
  *H01Q 5/307*   (2015.01)
  *H01Q 9/04*    (2006.01)
  *H01Q 21/06*   (2006.01)
  *H04B 7/0413*  (2017.01)

(52) U.S. Cl.
  CPC ............... *H01Q 5/10* (2015.01); *H01Q 9/045* (2013.01); *H01Q 21/061* (2013.01); *H04B 7/0413* (2013.01)

(56) References Cited

U.S. PATENT DOCUMENTS

| | | | |
|---|---|---|---|
| 8,421,700 B2* | 4/2013 | Sanford | H01Q 21/08 343/773 |
| 10,777,894 B2* | 9/2020 | McMichael | H01Q 9/0428 |
| 10,886,631 B2* | 1/2021 | Sanford | H01Q 1/48 |
| 11,316,282 B2* | 4/2022 | Chen | H01Q 1/38 |
| 2005/0206568 A1* | 9/2005 | Phillips | H01Q 5/40 343/700 MS |
| 2006/0262018 A1* | 11/2006 | Mikami | H01Q 1/42 343/700 MS |
| 2008/0117113 A1* | 5/2008 | Haziza | H01Q 13/0233 343/786 |
| 2020/0194877 A1* | 6/2020 | Choi | H01Q 1/3275 |
| 2021/0005977 A1* | 1/2021 | Franson | H01Q 21/065 |
| 2021/0218153 A1* | 7/2021 | Chapman | H01Q 1/42 |

FOREIGN PATENT DOCUMENTS

| | | |
|---|---|---|
| KR | 20180130700 | 12/2018 |
| KR | 20190049300 | 5/2019 |
| KR | 102023108 | 9/2019 |

* cited by examiner

Element length: E_length: EL

Element pyramid
→ Each element size : Not equal   "increasing in equal step"

→ Σ (EL(N) + α)

$$\alpha = \frac{EL(N+1)-EL(N)}{1/N}$$

ANTENNA SYSTEM MOUNTED IN VEHICLE

CROSS-REFERENCE TO RELATED APPLICATIONS

This application is the National Stage filing under 35 U.S.C. 371 of International Application No. PCT/KR2019/016323, filed on Nov. 26, 2019, the contents of which are all incorporated by reference herein in their entirety.

TECHNICAL FIELD

The present disclosure relates to an antenna system mounted in a vehicle. One particular implementation relates to an antenna system having a broadband antenna that is capable of operating in various communication systems, and to a vehicle having the same.

BACKGROUND ART

Electronic devices may be classified into mobile/portable terminals and stationary terminals according to mobility. Also, the electronic devices may be classified into handheld types and vehicle mount types according to whether or not a user can directly carry.

Functions of electronic devices are diversifying. Examples of such functions include data and voice communications, capturing images and video via a camera, recording audio, playing music files via a speaker system, and displaying images and video on a display. Some mobile terminals include additional functionality which supports electronic game playing, while other terminals are configured as multimedia players. Specifically, in recent time, mobile terminals can receive broadcast and multicast signals to allow viewing of video or television programs As it becomes multifunctional, an electronic device can be allowed to capture still images or moving images, play music or video files, play games, receive broadcast and the like, so as to be implemented as an integrated multimedia player.

Efforts are ongoing to support and increase the functionality of electronic devices. Such efforts include software and hardware improvements, as well as changes and improvements in the structural components.

In addition to those attempts, the electronic devices provide various services in recent years by virtue of commercialization of wireless communication systems using an LTE communication technology. In the future, it is expected that a wireless communication system using a 5G communication technology will be commercialized to provide various services. Meanwhile, some of LTE frequency bands may be allocated to provide 5G communication services.

In this regard, the mobile terminal may be configured to provide 5G communication services in various frequency bands. Recently, attempts have been made to provide 5G communication services using a Sub-6 band under a 6 GHz band. In the future, it is also expected to provide 5G communication services by using a millimeter-wave (mm-Wave) band in addition to the Sub-6 band for a faster data rate.

Recently, the necessity of providing such a communication service through a vehicle is increasing. Meanwhile, there is a need for a fifth generation (5G) communication service, which is a next generation communication service, as well as existing communication services such as LTE (Long Term Evolution) and the like in relation to communication services.

Accordingly, broadband antennas operating in both the LTE frequency bands and the 5G Sub6 frequency bands need to be disposed in a vehicle other than an electronic device. However, broadband antennas such as cone antennas have problems in that a vertical profile and a weight increase due to an increase in an overall antenna size, particularly, a height.

In addition, the broadband antennas such as the cone antennas may be implemented in a three-dimensional structure compared to related art planar antennas. In addition, multiple-input/multi-output (MIMO) should be implemented in an electronic device or vehicle to improve communication reliability and communication capacity. To this end, it is necessary to arrange a plurality of broadband antennas in the electronic device or vehicle.

This causes a problem that any detailed arrangement structure has not been taught to arrange cone antennas having such a three-dimensional structure in an electronic device or vehicle while maintaining a low interference level among the cone antennas.

In addition, it is necessary to improve antenna performance while maintaining a low profile structure in the three-dimensional antenna system. However, in the three-dimensional antenna system, a mechanical structure for fixing the antenna in a vehicle is required while securing a height of an antenna itself. This may cause a problem that the antenna performance should be improved while maintaining the mechanical structure to be equal to or lower than a predetermined height.

When the antenna system is disposed in the vehicle, a plurality of antennas may be disposed. Among these antennas, an antenna operating in a low band (LB) of 600 MHz to 960 MHz has a difficulty in satisfying performance in the corresponding band. Therefore, it is necessary to design an optimal antenna that allows the antenna operating in the low band LB to operate in a broad frequency band.

DISCLOSURE OF INVENTION

Technical Problem

The present disclosure is directed to solving the aforementioned problems and other drawbacks. The present disclosure also describes improvement of antenna performance while maintaining a height of an antenna system mounted in a vehicle to be lower than or equal to a predetermined height.

The present disclosure further describes a structure for mounting an antenna system, which is capable of operating in a broad frequency band to support various communication systems, in a vehicle.

The present disclosure further describes an antenna having various structures, which can operate in a low band LB.

The present disclosure further describes antenna performance that is optimized in an antenna of various structures which can operate in a low band LB.

Solution to Problem

In order to achieve the above or other aspects of the subject matter disclosed herein, there is provided an antenna system mounted in a vehicle. The antenna system may include a radiator configured to transmit a signal applied through a lower aperture to an upper aperture, a coupling patch disposed on an upper substrate to be spaced apart from the upper aperture by a predetermined distance so that the signal transmitted to the upper aperture is coupled, and a first antenna including a shorting bar connected in surface-contact with the coupling patch and configured to connect a ground layer of a lower substrate. The antenna system may further include a second antenna disposed in the antenna system, separately from the first antenna.

According to one implementation, the antenna system may further include a transceiver circuit configured to control a signal to be radiated through at least one of the first antenna and the second antenna.

According to one implementation, the upper aperture and the lower aperture may be formed in a circular, oval, or polygonal shape.

According to one implementation, a signal applied from a feeding line through the lower aperture may be transmitted to the upper aperture through an inside of the radiator so as to be coupled to a stack patch corresponding to a metal patch.

According to one implementation, the antenna system may further include a stack patch disposed to be spaced apart from the upper aperture by a predetermined height so that the signal transmitted to the upper aperture is coupled, and the stack patch may be disposed on the upper substrate to be spaced apart from the coupling patch by a predetermined distance.

According to one implementation, the upper aperture and the lower aperture may have a rectangular shape, and the radiator may be configured as a pyramidal radiator in which the upper aperture is larger than the lower aperture in size. The coupling patch may have a rectangular shape.

According to one implementation, the shorting bar may include a connection part connected to one region of an inside of the coupling patch, and extension parts bent from the connection part at predetermined angles. Terminated portions of the extension parts may be connected to the ground layer of the lower substrate.

According to one implementation, a second length of the extension part connected to a fastening part may be longer than a first length of the extension part connected to the connection part so that an antenna bandwidth can extend by multi-resonance.

According to one implementation, the connection part may be disposed in an edge region corresponding to one end portion of the coupling patch. Accordingly, the first antenna can resonate up to a first frequency band that is a lower band (LB).

According to one implementation, outer rims integrally formed with the pyramidal radiator and the upper substrate may be connected by screws, and the first antenna may resonate at multiple frequencies by a multi-wing structure constituting the outer rims.

According to one implementation, the multi-wing structure may include four wings integrally formed with a rim of the upper aperture of the pyramidal radiator at upper left, lower left, upper right, and lower right of the pyramidal radiator, so that the first antenna resonates at multiple frequencies.

According to one implementation, the multi-wing structure may include six wings integrally formed with a rim of the upper aperture of the pyramidal radiator at upper left, left center, lower left, upper right, right center, and lower right of the pyramidal radiator, so that the first antenna resonates at more frequencies, compared to the multi-wing structure with four wings.

According to one implementation, the multi-wing structure having the six wings may be configured such that a height of a coupling structure between the outer rims and the upper substrate increases as the radiator is adjacent to a second metal plate as the coupling patch. A first metal plate corresponding to a metal patch on an upper portion of the radiator may be disposed at a predetermined inclination as the height of the coupling structure increases.

According to one implementation, a stack patch disposed on an upper portion of the radiator may be configured as a first metal plate and the shorting bar may be connected to a screw boss formed at one point in a second metal plate corresponding to the coupling patch.

According to one implementation, the connection part of the shorting bar may be formed by a predetermined length up to a position connected to the lower substrate. The extension parts of the shorting bar may extend orthogonally on the same plane as the connection part. Also, the extension parts may extend vertically downward from the orthogonally extended end portions to be coupled to fastening parts fastened to the ground layer of the lower substrate.

According to one implementation, the second antenna may include a plurality of cone antennas each including a cone radiator and a patch antenna. The antenna system may further include a baseband processor configured to perform MIMO through the plurality of cone antennas.

According to one implementation, the baseband processor may perform MIMO through the first antenna and at least one of the plurality of cone antennas.

According to one implementation, the first antenna may operate as a radiator in a low band that is a first frequency band and a second frequency band higher than the first frequency band, and the second antenna may operate as a radiator in the second frequency band.

According to one implementation, the baseband processor may be configured to perform carrier aggregation (CA) by receiving a first signal of the first frequency band through the first antenna and a second signal of the second frequency band through the second antenna.

According to another aspect of the subject matter disclosed herein, there is provided a vehicle having an antenna assembly. The vehicle may include a radiator configured to transmit a signal applied through a lower aperture to an upper aperture, a coupling patch disposed on an upper substrate to be spaced apart from the upper aperture by a predetermined distance so that the signal transmitted to the upper aperture is coupled, and a first antenna including a shorting bar connected in surface-contact with the coupling patch and configured to connect a metal path and a ground layer of a lower substrate. The vehicle may further include a second antenna disposed in the antenna system, separately from the first antenna, a transceiver circuit configured to control a signal to be radiated through at least one of the first antenna and the second antenna, and a baseband processor configured to communicate with at least one of an adjacent vehicle, a Road Side Unit (RSU) and a base station through the transceiver circuit.

Advantageous Effects of Invention

Hereinafter, technical effects of an antenna system having a plurality of antennas including a broadband antenna, and a vehicle having the same will be described.

According to the present disclosure, a broadband antenna structure that can cover both a 4G band and a 5G band in an antenna system mounted in a vehicle can be provided.

In addition, various communication systems can be supported by implementing a low band (LB) antenna and other antennas in a single antenna module.

An antenna that covers a full band from 600 MHz to 3.8 GHz can be provided through an inverted-pyramidal radiator having a structure optimized to have different resonance lengths.

A structure for mounting an antenna system that can operate in a wide frequency band can be provided.

According another aspect, various antenna structures that can operate in the low band LB can be provided by coupling a shorting bar as well as a shorting pin to a metal plate.

The antenna system can be optimized with different antennas in the low band LB and other bands. This can result in arranging the antenna system with optimal configuration and performance in a roof frame of the vehicle.

The antenna system of the vehicle can implement MIMO and diversity operations using a plurality of antennas in specific bands.

According to another aspect, antenna performance optimized according to various structures that can operate in the low band LB can be provided by coupling a shorting bar and a metal path in various structures and shapes.

Further scope of applicability of the present disclosure will become apparent from the following detailed description. It should be understood, however, that the detailed description and specific examples, such as the preferred embodiment of the invention, are given by way of illustration only, since various changes and modifications within the spirit and scope of the invention will be apparent to those skilled in the art.

MODE FOR THE INVENTION

Figure 1:
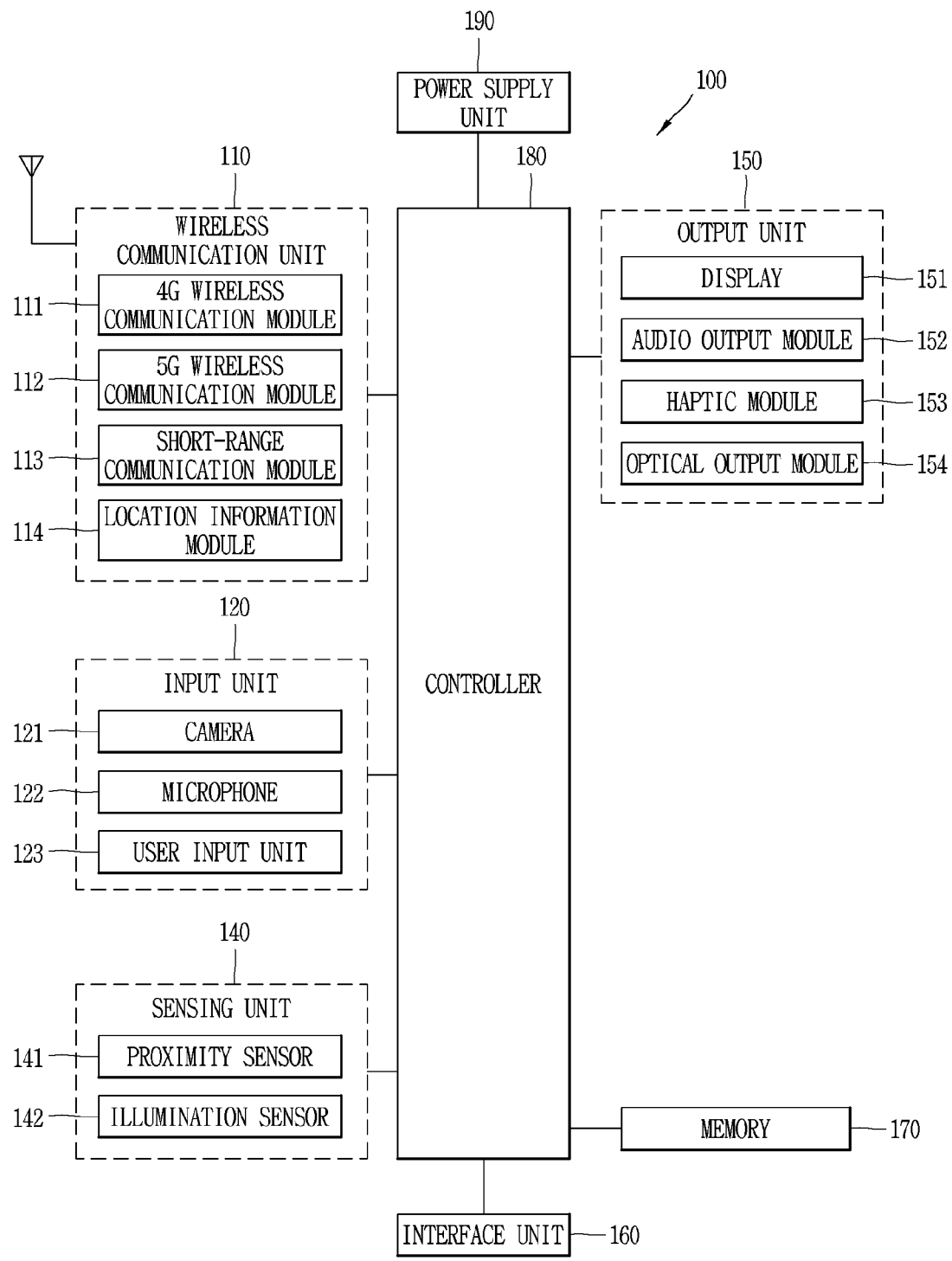
FIG. 1 is a block diagram of an electronic device in accordance with the present disclosure.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Electronic devices presented herein may be implemented using a variety of different types of terminals. Examples of such devices include cellular phones, smart phones, laptop computers, digital broadcasting terminals, personal digital assistants (PDAs), portable multimedia players (PMPs), navigators, slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

On the other hand, an antenna system mounted on a vehicle disclosed in this specification mainly refers to an antenna system disposed on an outside of the vehicle, but may also include a mobile terminal (electronic device) belonging to a user aboard the vehicle.

FIG. 1 is a block diagram of an electronic device in accordance with the present disclosure. Here, the electronic device may include a mobile terminal (electronic device) disposed inside the vehicle or carried by a user who is on board the vehicle. Also, a vehicle in which a communication system such as an antenna system is mounted may be referred to as an electronic device.

The electronic device 100 may be shown having components such as a wireless communication unit 110, an input unit 120, a sensing unit 140, an output unit 150, an interface unit 160, a memory 170, a controller 180, and a power supply unit 190. It is understood that implementing all of the illustrated components illustrated in FIG. 1 is not a requirement, and that greater or fewer components may alternatively be implemented.

In more detail, among others, the wireless communication unit 110 may typically include one or more modules which permit communications such as wireless communications between the electronic device 100 and a wireless communication system, communications between the electronic device 100 and another electronic device, or communications between the electronic device 100 and an external server. Further, the wireless communication unit 110 may typically include one or more modules which connect the electronic device 100 to one or more networks. Here, the one or more networks may be, for example, a 4G communication network and a 5G communication network.

The wireless communication unit 110 may include at least one of a 4G wireless communication module 111, a 5G wireless communication module 112, a short-range communication module 113, and a location information module 114.

The 4G wireless communication module 111 may perform transmission and reception of 4G signals with a 4G base station through a 4G mobile communication network. In this case, the 4G wireless communication module 111 may transmit at least one 4G transmission signal to the 4G base station. In addition, the 4G wireless communication module 111 may receive at least one 4G reception signal from the 4G base station.

In this regard, Uplink (UL) Multi-input and Multi-output (MIMO) may be performed by a plurality of 4G transmission signals transmitted to the 4G base station. In addition, Downlink (DL) MIMO may be performed by a plurality of 4G reception signals received from the 4G base station.

The 5G wireless communication module 112 may perform transmission and reception of 5G signals with a 5G base station through a 5G mobile communication network. Here, the 4G base station and the 5G base station may have a Non-Stand-Alone (NSA) structure. For example, the 4G base station and the 5G base station may be a co-located structure in which the stations are disposed at the same location in a cell. Alternatively, the 5G base station may be disposed in a Stand-Alone (SA) structure at a separate location from the 4G base station.

The 5G wireless communication module 112 may perform transmission and reception of 5G signals with a 5G base station through a 5G mobile communication network. In this case, the 5G wireless communication module 112 may transmit at least one 5G transmission signal to the 5G base station. In addition, the 5G wireless communication module 112 may receive at least one 5G reception signal from the 5G base station.

In this instance, 5G and 4G networks may use the same frequency band, and this may be referred to as LTE re-farming. In some examples, a Sub 6 frequency band, which is a range of 6 GHz or less, may be used as the 5G frequency band.

On the other hand, a millimeter-wave (mmWave) range may be used as the 5G frequency band to perform wideband high-speed communication. When the mmWave band is used, the electronic device 100 may perform beamforming for communication coverage expansion with a base station.

On the other hand, regardless of the 5G frequency band, 5G communication systems can support a larger number of multi-input multi-output (MIMO) to improve a transmission rate. In this instance, UL MIMO may be performed by a plurality of 5G transmission signals transmitted to a 5G base station. In addition, DL MIMO may be performed by a plurality of 5G reception signals received from the 5G base station.

On the other hand, the wireless communication unit 110 may be in a Dual Connectivity (DC) state with the 4G base station and the 5G base station through the 4G wireless communication module 111 and the 5G wireless communication module 112. As such, the dual connectivity with the 4G base station and the 5G base station may be referred to as EUTRAN NR DC (EN-DC). Here, EUTRAN is an abbreviated form of "Evolved Universal Telecommunication Radio Access Network", and refers to a 4G wireless communication system. Also, NR is an abbreviated form of "New Radio" and refers to a 5G wireless communication system.

On the other hand, if the 4G base station and 5G base station are disposed in a co-located structure, throughput improvement can be achieved by inter-Carrier Aggregation (inter-CA). Accordingly, when the 4G base station and the 5G base station are disposed in the EN-DC state, the 4G reception signal and the 5G reception signal may be simultaneously received through the 4G wireless communication module 111 and the 5G wireless communication module 112.

The short-range communication module 113 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the electronic device 100 and a wireless communication system, communications between the electronic device 100 and another electronic device, or communications between the electronic device and a network where another electronic device (or an external server)

is located, via wireless area network. One example of the wireless area networks may be a wireless personal area network.

Short-range communication between electronic devices may be performed using the 4G wireless communication module 111 and the 5G wireless communication module 112. In one implementation, short-range communication may be performed between electronic devices in a device-to-device (D2D) manner without passing through base stations.

Meanwhile, for transmission rate improvement and communication system convergence, Carrier Aggregation (CA) may be carried out using at least one of the 4G wireless communication module 111 and the 5G wireless communication module 112 and a WiFi communication module. In this regard, 4G+WiFi CA may be performed using the 4G wireless communication module 111 and the Wi-Fi communication module 113. Or, 5G+WiFi CA may be performed using the 5G wireless communication module 112 and the Wi-Fi communication module 113.

The location information module 114 may be generally configured to detect, calculate, derive or otherwise identify a position (or current position) of the electronic device. As an example, the location information module 115 includes a Global Position System (GPS) module, a Wi-Fi module, or both. For example, when the electronic device uses a GPS module, a position of the electronic device may be acquired using a signal sent from a GPS satellite. As another example, when the electronic device uses the Wi-Fi module, a position of the electronic device can be acquired based on information related to a wireless Access Point (AP) which transmits or receives a wireless signal to or from the Wi-Fi module. If desired, the location information module 114 may alternatively or additionally function with any of the other modules of the wireless communication unit 110 to obtain data related to the position of the electronic device. The location information module 114 is a module used for acquiring the position (or the current position) and may not be limited to a module for directly calculating or acquiring the position of the electronic device.

Specifically, when the electronic device utilizes the 5G wireless communication module 112, the position of the electronic device may be acquired based on information related to the 5G base station which performs radio signal transmission or reception with the 5G wireless communication module. In particular, since the 5G base station of the mmWave band is deployed in a small cell having a narrow coverage, it is advantageous to acquire the position of the electronic device.

The input unit 120 may include a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) may be obtained by the input unit 120 and may be analyzed and processed according to user commands.

The sensor unit 140 may typically be implemented using one or more sensors configured to sense internal information of the electronic device, the surrounding environment of the electronic device, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The electronic device disclosed herein may be configured to utilize information obtained from one or more sensors, and combinations thereof.

The output unit 150 may typically be configured to output various types of information, such as audio, video, tactile output, and the like. The output unit 150 may be shown having at least one of a display 151, an audio output module 152, a haptic module 153, and an optical output module 154. The display 151 may have an inter-layered structure or an integrated structure with a touch sensor in order to implement a touch screen. The touch screen may function as the user input unit 123 which provides an input interface between the electronic device 100 and the user and simultaneously provide an output interface between the electronic device 100 and a user.

The interface unit 160 serves as an interface with various types of external devices that are coupled to the electronic device 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the electronic device 100 may perform assorted control functions associated with a connected external device, in response to the external device being connected to the interface unit 160.

The memory 170 is typically implemented to store data to support various functions or features of the electronic device 100. For instance, the memory 170 may be configured to store application programs executed in the electronic device 100, data or instructions for operations of the electronic device 100, and the like. Some of these application programs may be downloaded from an external server via wireless communication. Other application programs may be installed within the electronic device 100 at the time of manufacturing or shipping, which is typically the case for basic functions of the electronic device 100 (for example, receiving a call, placing a call, receiving a message, sending a message, and the like). It is common for application programs to be stored in the memory 170, installed in the electronic device 100, and executed by the controller 180 to perform an operation (or function) for the electronic device 100.

The controller 180 typically functions to control an overall operation of the electronic device 100, in addition to the operations associated with the application programs. The control unit 180 may provide or process information or functions appropriate for a user by processing signals, data, information and the like, which are input or output by the aforementioned various components, or activating application programs stored in the memory 170.

Also, the controller 180 may control at least some of the components illustrated in FIG. 1, to execute an application program that have been stored in the memory 170. In addition, the controller 180 may control a combination of at least two of those components included in the electronic device 100 to activate the application program.

The power supply unit 190 may be configured to receive external power or provide internal power in order to supply appropriate power required for operating elements and components included in the electronic device 100. The power supply unit 190 may include a battery, and the battery may be configured to be embedded in the terminal body, or configured to be detachable from the terminal body.

At least part of the components may cooperably operate to implement an operation, a control or a control method of an electronic device according to various implementations disclosed herein. Also, the operation, the control or the control method of the electronic device may be implemented on the electronic device by an activation of at least one application program stored in the memory 170.

Figure 2A:
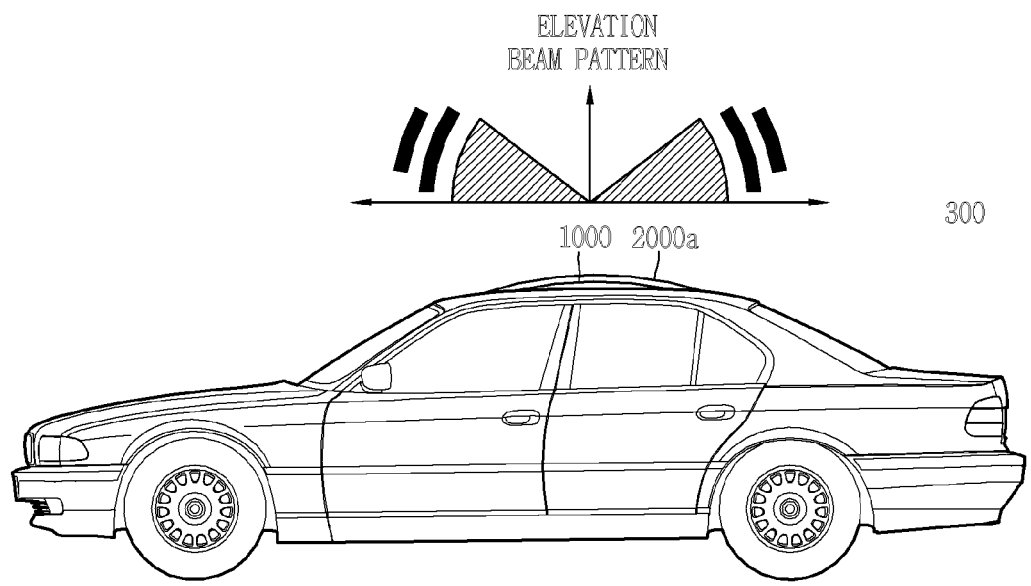
FIGS. 2A to 2C are views illustrating an example of a structure for mounting an antenna system on a vehicle, which includes the antenna system mounted on the vehicle.
Figure 2B:
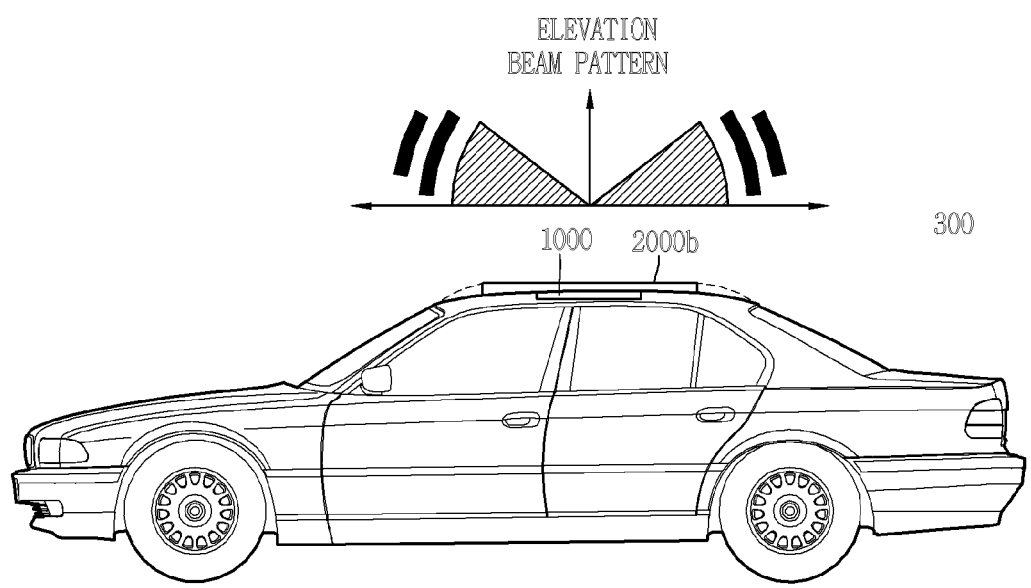
Figure 2C:
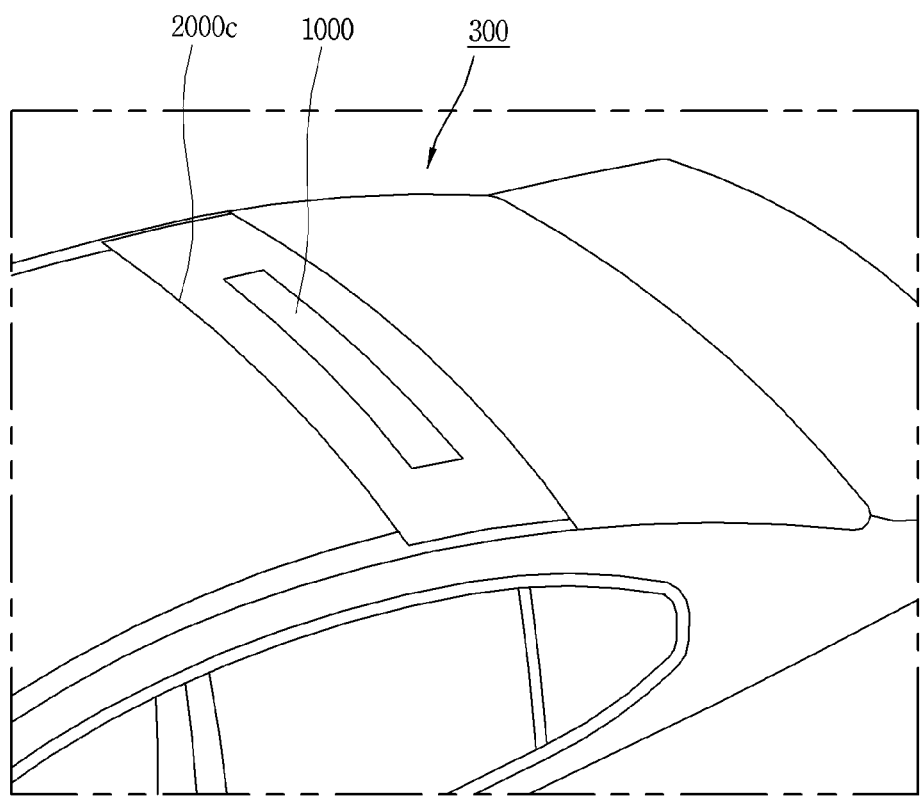

FIGS. 2A to 2C are views illustrating an example of a structure for mounting an antenna system on a vehicle, which includes the antenna system mounted on the vehicle. In this regard, FIGS. 2A and 2B illustrate a configuration in which an antenna system 1000 is mounted on or in a roof of a vehicle. Meanwhile, FIG. 2C illustrates a structure in which the antenna system 1000 is mounted on a roof of the vehicle and a roof frame of a rear mirror.

Referring to FIGS. 2A to 2C, in order to improve the appearance of the vehicle and to maintain a telematics performance at the time of collision, an existing shark fin antenna is replaced with a flat antenna of a non-protruding shape. In addition, the present disclosure proposes an integrated antenna of an LTE antenna and a 5G antenna considering fifth generation (5G) communication while providing the existing mobile communication service (e.g., LTE).

Referring to FIG. 2A, the antenna system 1000 may be disposed on the roof of the vehicle. In FIG. 2A, a radome 2000a for protecting the antenna system 1000 from an external environment and external impacts while the vehicle travels may cover the antenna system 1000. The radome 2000a may be made of a dielectric material through which radio signals are transmitted/received between the antenna system 1000 and a base station.

Referring to 2B, the antenna system 1000 may be disposed within a roof structure 2000b of the vehicle, and at least part of the roof structure 2000b may be made of a non-metallic material. At this time, the at least part of the roof structure 2000b of the vehicle may be realized as the non-metallic material, and may be made of a dielectric material through which radio signals are transmitted/received between the antenna system 1000 and the base station.

Also, referring to 2C, the antenna system 1000 may be disposed within a roof frame 2000c of the vehicle, and at least part of the roof frame 200c may be made of a non-metallic material. At this time, the at least part of the roof frame 2000c of the vehicle may be realized as the non-metallic material, and may be made of a dielectric material through which radio signals are transmitted/received between the antenna system 1000 and the base station.

Figure 3:
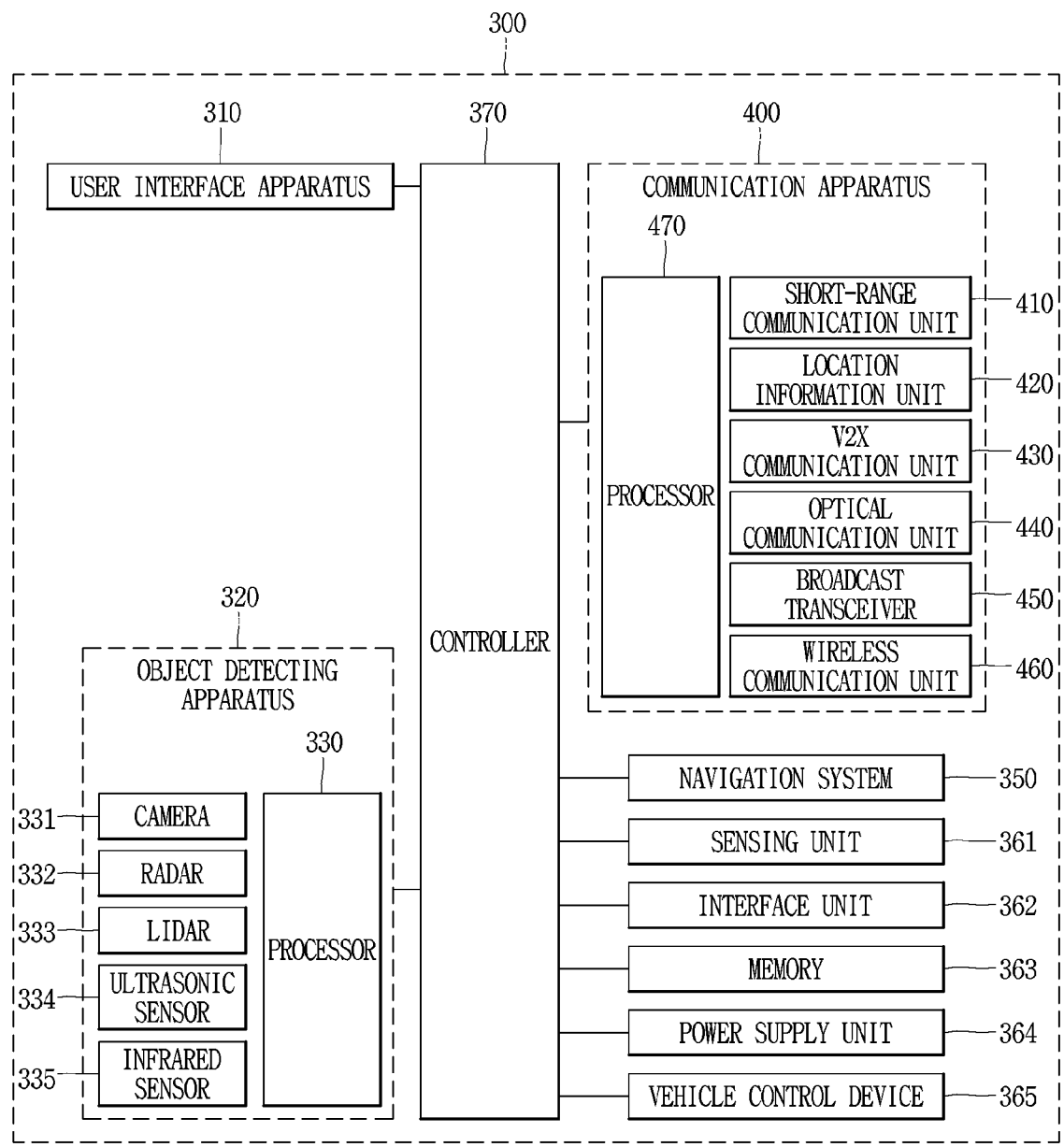
FIG. 3 is a block diagram illustrating a vehicle in accordance with an implementation.

Meanwhile, the antenna system 1000 may be installed on a front or rear surface of the vehicle depending on applications, other than the roof structure or roof frame of the vehicle. FIG. 3 is a block diagram illustrating a vehicle in accordance with an implementation of the present disclosure.

As illustrated in FIG. 2A to 3, a vehicle 300 may include wheels turning by a driving force, and a steering apparatus for adjusting a driving (ongoing, moving) direction of the vehicle 300.

The vehicle 300 may be an autonomous vehicle. The vehicle 300 may be switched into an autonomous mode or a manual mode based on a user input. For example, the vehicle 300 may be switched from the manual mode into the autonomous mode or from the autonomous mode into the manual mode based on a user input received through a user interface apparatus 310.

The vehicle 300 may be switched into the autonomous mode or the manual mode based on driving environment information. The driving environment information may be generated based on object information provided from an object detecting apparatus 320. For example, the vehicle 300 may be switched from the manual mode into the autonomous mode or from the autonomous mode into the manual mode based on driving environment information generated in the object detecting apparatus 320.

In an example, the vehicle 300 may be switched from the manual mode into the autonomous mode or from the autonomous mode into the manual mode based on driving environment information received through a communication apparatus 400. The vehicle 300 may be switched from the manual mode into the autonomous mode or from the autonomous mode into the manual mode based on information, data or signal provided from an external device.

When the vehicle 300 is driven in the autonomous mode, the autonomous vehicle 300 may be driven based on an operation system. For example, the autonomous vehicle 300 may be driven based on information, data or signal generated in a driving system, a parking exit system, and a parking system.

When the vehicle 300 is driven in the manual mode, the autonomous vehicle 300 may receive a user input for driving through a driving control apparatus. The vehicle 300 may be driven based on the user input received through the driving control apparatus.

An overall length refers to a length from a front end to a rear end of the vehicle 300, a width refers to a width of the vehicle 300, and a height refers to a length from a bottom of a wheel to a roof. In the following description, an overall-length direction L may refer to a direction which is a criterion for measuring the overall length of the vehicle 300, a width direction W may refer to a direction that is a criterion for measuring a width of the vehicle 300, and a height direction H may refer to a direction that is a criterion for measuring a height of the vehicle 300.

As illustrated in FIG. 3, the vehicle 300 may include a user interface apparatus 310, an object detecting apparatus 320, a navigation system 350, and a communication device 400. In addition, the vehicle may further include a sensing unit 361, an interface unit 362, a memory 363, a power supply unit 364, and a vehicle control device 365 in addition to the aforementioned apparatuses and devices. Here, the sensing unit 361, the interface unit 362, the memory 363, the power supply unit 364, and the vehicle control device 365 may have low direct relevance to wireless communication through the antenna system 1000 according to the present disclosure. So, a detailed description thereof will be omitted herein.

According to embodiments, the vehicle 300 may include more components in addition to components to be explained in this specification or may not include some of those components to be explained in this specification.

The user interface apparatus 310 is an apparatus for communication between the vehicle 300 and a user. The user interface apparatus 310 may receive a user input and provide information generated in the vehicle 300 to the user. The vehicle 310 may implement user interfaces (UIs) or user experiences (UXs) through the user interface apparatus 200.

The object detecting apparatus 320 is an apparatus for detecting an object located at outside of the vehicle 300. The object may be a variety of objects associated with driving (operation) of the vehicle 300. Meanwhile, objects may be classified into a moving object and a fixed object. For example, the moving object may be a concept including another vehicle and a pedestrian. The fixed object may be a concept including a traffic signal, a road and a structure, for example.

The object detecting apparatus 320 may include a camera 321, a radar 322, a LiDAR 323, an ultrasonic sensor 324, an infrared sensor 325, and a processor 330.

According to an embodiment, the object detecting apparatus 320 may further include other components in addition to the components described, or may not include some of the components described.

The processor 330 may control an overall operation of each unit of the object detecting apparatus 320. The processor 330 may detect an object based on an acquired image, and track the object. The processor 330 may execute operations, such as a calculation of a distance from the object, a calculation of a relative speed with the object and the like, through an image processing algorithm.

The processor 330 may detect an object based on a reflected electromagnetic wave which an emitted electromagnetic wave is reflected from the object, and track the object. The processor 330 may execute operations, such as a calculation of a distance from the object, a calculation of a relative speed with the object and the like, based on the electromagnetic wave.

The processor 330 may detect an object based on a reflected laser beam which an emitted laser beam is reflected from the object, and track the object. The processor 330 may execute operations, such as a calculation of a distance from the object, a calculation of a relative speed with the object and the like, based on the laser beam.

The processor 330 may detect an object based on a reflected ultrasonic wave which an emitted ultrasonic wave is reflected from the object, and track the object. The processor 330 may execute operations, such as a calculation of a distance from the object, a calculation of a relative speed with the object and the like, based on the ultrasonic wave.

The processor 330 may detect an object based on reflected infrared light which emitted infrared light is reflected from the object, and track the object. The processor 330 may execute operations, such as a calculation of a distance from the object, a calculation of a relative speed with the object and the like, based on the infrared light.

According to an embodiment, the object detecting apparatus 320 may include a plurality of processors 330 or may not include any processor 330. For example, each of the camera 321, the radar 322, the LiDAR 323, the ultrasonic sensor 324 and the infrared sensor 325 may include the processor in an individual manner.

When the processor 330 is not included in the object detecting apparatus 320, the object detecting apparatus 320 may operate according to the control of a processor of an apparatus within the vehicle 300 or the controller 370.

The navigation system 350 may provide location information related to the vehicle based on information obtained through the communication apparatus 400, in particular, a location information unit 420. Also, the navigation system 350 may provide a path (or route) guidance service to a destination based on current location information related to the vehicle. In addition, the navigation system 350 may provide guidance information related to surroundings of the vehicle based on information obtained through the object detecting apparatus 320 and/or a V2X communication unit 430. In some examples, guidance information, autonomous driving service, etc. may be provided based on V2V, V2I, and V2X information obtained through a wireless communication unit operating together with the antenna system 1000.

The object detecting apparatus 320 may operate according to the control of the controller 370.

The communication apparatus 400 is an apparatus for performing communication with an external device. Here, the external device may be another vehicle, a mobile terminal, or a server.

The communication apparatus 400 may perform the communication by including at least one of a transmitting antenna, a receiving antenna, and radio frequency (RF) circuit and RF device for implementing various communication protocols.

The communication apparatus 400 may include a short-range communication unit 410, a location information unit 420, a V2X communication unit 430, an optical communication unit 440, a broadcast transceiver 450 and a processor 470.

According to an implementation, the communication apparatus 400 may further include other components in addition to the components described, or may not include some of the components described.

The short-range communication unit 410 is a unit for facilitating short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The short-range communication unit 410 may construct short-range wireless area networks to perform short-range communication between the vehicle 300 and at least one external device.

The location information unit 420 may be a unit for acquiring location information related to the vehicle 300. For example, the location information unit 420 may include a Global Positioning System (GPS) module or a Differential Global Positioning System (DGPS) module.

The V2X communication unit 430 may be a unit for performing wireless communication with a server (Vehicle to Infrastructure; V2I), another vehicle (Vehicle to Vehicle; V2V), or a pedestrian (Vehicle to Pedestrian; V2P). The V2X communication unit 430 may include an RF circuit implementing communication protocols such as V2I, V2V, and V2P.

The optical communication unit 440 is a unit for performing communication with an external device through the medium of light. The optical communication unit 440 may include a light-emitting diode for converting an electric signal into an optical signal and sending the optical signal to the exterior, and a photodiode for converting the received optical signal into an electric signal.

In some implementations, the light-emitting diode may be integrated with lamps provided on the vehicle 300.

The broadcast transceiver 450 may be a unit for receiving a broadcast signal from an external broadcast managing entity or transmitting a broadcast signal to the broadcast managing entity via a broadcast channel. The broadcast channel may include a satellite channel, a terrestrial channel, or both. The broadcast signal may include a TV broadcast signal, a radio broadcast signal and a data broadcast signal.

The wireless communication unit 460 is a unit that performs wireless communications with one or more communication systems through one or more antenna systems. The wireless communication unit 460 may transmit and/or receive a signal to and/or from a device in a first communication system through a first antenna system. In addition, the wireless communication unit 460 may transmit and/or receive a signal to and/or from a device in a second communication system through a second antenna system. For example, the first communication system and the second communication system may be an LTE communication system and a 5G communication system, respectively. However, the first communication system and the second communication system may not be limited thereto, and may be changed according to applications.

According to the present disclosure, the antenna system 1000 operating in the first and second communication systems may be disposed on the roof, in the roof or in the roof frame of the vehicle 300 according to one of FIGS. 2A to 2C. Meanwhile, the wireless communication unit 460 of FIG. 3 may operate in both the first and second communication systems, and may be combined with the antenna system 1000 to provide multiple communication services to the vehicle 300.

The processor 470 may control an overall operation of each unit of the communication apparatus 400.

According to an embodiment, the communication apparatus 400 may include a plurality of processors 470 or may not include any processor 470.

When the processor 470 is not included in the communication apparatus 400, the communication apparatus 400 may operate according to the control of a processor of another device within the vehicle 300 or the controller 370.

Meanwhile, the communication apparatus 400 may implement a display apparatus for a vehicle together with the user interface apparatus 310. In this instance, the display apparatus for the vehicle may be referred to as a telematics apparatus or an Audio Video Navigation (AVN) apparatus.

The communication apparatus 400 may operate according to the control of the controller 370.

At least one processor and the controller 370 included in the vehicle 300 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro controllers, microprocessors, and electric units performing other functions.

The vehicle 300 related to the present disclosure can operate in any one of a manual driving mode and an autonomous driving mode. That is, the driving modes of the vehicle 300 may include the manual driving mode and the autonomous driving mode.

Hereinafter, description will be given of implementations of a multi-transceiving system structure and an electronic device or vehicle having the same with reference to the accompanying drawings. Specifically, implementations related to a broadband antenna operating in a heterogeneous radio system, and an electronic device and a vehicle having the same will be described. It will be apparent to those skilled in the art that the present disclosure may be embodied in other specific forms without departing from the spirit or essential characteristics thereof.

Figure 4:
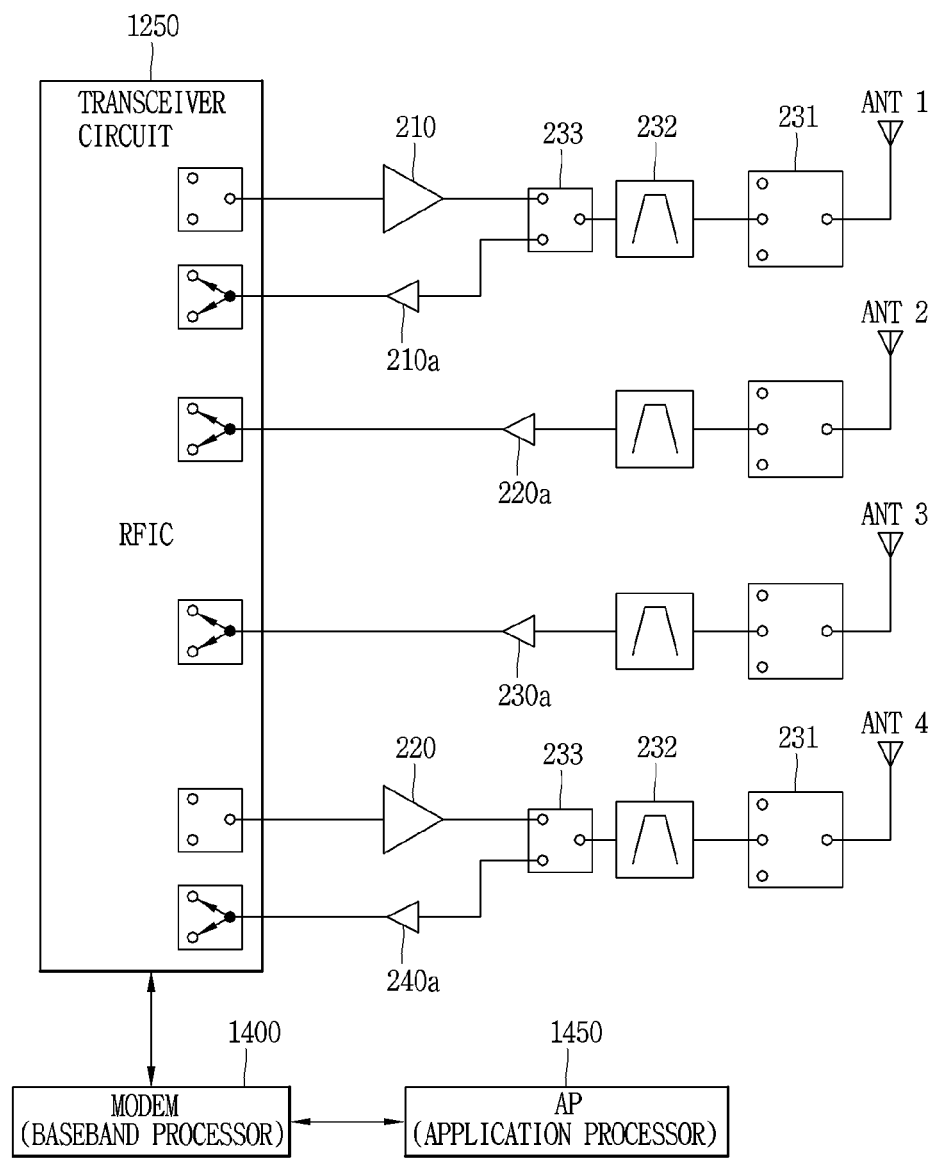
FIG. 4 is a block diagram illustrating a configuration of a wireless communication unit of an electronic device or vehicle operable in a plurality of wireless communication systems according to the present disclosure.

FIG. 4 is a block diagram illustrating a configuration of a wireless communication unit of an electronic device or vehicle operable in a plurality of wireless communication systems according to the present disclosure. Referring to FIG. 4, the electronic device or the vehicle may include a first power amplifier 210, a second power amplifier 220, and an RFIC 1250. In addition, the electronic device or the vehicle may further include a modem 1400 and an application processor (AP) 1450. Here, the modem 1400 and the application processor (AP) 1450 may be physically implemented on a single chip, and may be implemented in a logically and functionally separated form. However, the present disclosure may not be limited thereto and may be implemented in the form of a chip that is physically separated according to an application.

Meanwhile, the electronic device or the vehicle may include a plurality of low noise amplifiers (LNAs) 210a to 240a in the receiver. Here, the first power amplifier 210, the second power amplifier 220, the RFIC 1250, and the plurality of low noise amplifiers 210a to 240a may all be operable in the first communication system and the second communication system. In this case, the first communication system and the second communication system may be a 4G communication system and a 5G communication system, respectively.

As illustrated in FIG. 2, the RFIC 1250 may be configured as a 4G/5G integrated type, but the present disclosure may not be limited thereto. The RFIC 250 may be configured as a 4G/5G separate type according to an application. When the RFIC 1250 is configured as the 4G/5G integrated type, it may be advantageous in terms of synchronization between 4G and 5G circuits, and simplification of control signaling by the modem 1400.

On the other hand, when the RFIC 1250 is configured as the 4G/5G separate type, it may be referred to as a 4G RFIC and a 5G RFIC, respectively. In particular, when there is a great band difference between the 5G band and the 4G band, such as when the 5G band is configured as a millimeter wave band, the RFIC 1250 may be configured as a 4G/5G separated type. As such, when the RFIC 1250 is configured as the 4G/5G separate type, there may be an advantage that the RF characteristics can be optimized for each of the 4G band and the 5G band.

Meanwhile, even when the RFIC 1250 is configured as the 4G/5G separate type, the 4G RFIC and the 5G RFIC may be logically and functionally separated but physically implemented in one chip.

On the other hand, the application processor (AP) 1450 may be configured to control the operation of each component of the electronic device. Specifically, the application processor (AP) 1450 may control the operation of each component of the electronic device through the modem 1400.

For example, the modem 1400 may be controlled through a power management IC (PMIC) for low power operation of the electronic device. Accordingly, the modem 1400 may operate power circuits of a transmitter and a receiver through the RFIC 1250 in a low power mode.

In this regard, when the electronic device is determined to be in an idle mode, the application processor (AP) 1450 may control the RFIC 1250 through the modem 400 as follows. For example, when the electronic device is in an idle mode, the application processor 1450 may control the RFIC 1250 through the modem 1400, such that at least one of the first and second power amplifiers 210 and 220 operates in a low power mode or is turned off.

According to another implementation, the application processor (AP) 1450 may control the modem 1400 to enable wireless communication capable of performing low power communication when the electronic device is in a low battery mode. For example, when the electronic device is connected to a plurality of entities among a 4G base station, a 5G base station, and an access point, the application processor (AP) 1450 may control the modem 1400 to enable wireless communication at the lowest power. Accordingly, even though a throughput is slightly sacrificed, the application processor (AP) 1450 may control the modem 1400 and the RFIC 1250 to perform short-range communication using only the short-range communication module 113.

According to another implementation, when a remaining battery capacity of the electronic device is equal to or greater than a threshold value, the application processor 1450 may control the modem 1400 to select an optimal wireless interface. For example, the application processor (AP) 1450 may control the modem 1400 to receive data through both the 4G base station and the 5G base station according to the remaining battery capacity and the available radio resource information. In this case, the application processor (AP) 1450 may receive the remaining battery capacity information from the PMIC and the available radio resource information from the modem 1400. Accordingly, when the remaining battery capacity and the available radio resources are sufficient, the application processor (AP) 1450 may control the modem 1400 and the RFIC 1250 to receive data through both the 4G base station and 5G base station.

Meanwhile, in a multi-transceiving system of FIG. 4, a transmitter and a receiver of each radio system may be integrated into a single transceiver. Accordingly, a circuit portion for integrating two types of system signals may be removed from an RF front-end.

Furthermore, since the front end parts can be controlled by an integrated transceiver, the front end parts may be more efficiently integrated than when the transceiving system is separated by communication systems.

In addition, when separated for each communication system, different communication systems cannot be controlled as needed, or because this may lead to a system delay, resources cannot be efficiently allocated. On the other hand, in the multi-transceiving system as illustrated in FIG. 2, different communication systems can be controlled as needed, system delay can be minimized, and resources can be efficiently allocated.

Meanwhile, the first power amplifier 210 and the second power amplifier 220 may operate in at least one of the first and second communication systems. In this regard, when the 5G communication system operates in a 4G band or a Sub 6 band, the first and second power amplifiers 1210 and 220 can operate in both the first and second communication systems.

On the other hand, when the 5G communication system operates in a millimeter wave (mmWave) band, one of the first and second power amplifiers 210 and 220 may operate in the 4G band and the other in the millimeter-wave band.

On the other hand, two different wireless communication systems may be implemented in one antenna by integrating a transceiver and a receiver to implement a two-way antenna. In this case, 4×4 MIMO may be implemented using four antennas as illustrated in FIG. 2. At this time, 4×4 DL MIMO may be performed through downlink (DL).

Meanwhile, when the 5G band is a Sub 6 band, first to fourth antennas ANT1 to ANT4 may be configured to operate in both the 4G band and the 5G band. On the contrary, when the 5G band is a millimeter wave (mmWave) band, the first to fourth antennas ANT1 to ANT4 may be configured to operate in one of the 4G band and the 5G band. In this case, when the 5G band is the millimeter wave (mmWave) band, each of the plurality of antennas may be configured as an array antenna in the millimeter wave band.

Meanwhile, 2×2 MIMO may be implemented using two antennas connected to the first power amplifier 210 and the second power amplifier 220 among the four antennas. At this time, 2×2 UL MIMO (2 Tx) may be performed through uplink (UL). Alternatively, the present disclosure is not limited to 2×2 UL MIMO, and may also be implemented as 1 Tx or 4 Tx. In this case, when the 5G communication system is implemented by 1 Tx, only one of the first and second power amplifiers 210 and 220 need to operate in the 5G band. Meanwhile, when the 5G communication system is implemented by 4 Tx, an additional power amplifier operating in the 5G band may be further provided. Alternatively, a transmission signal may be branched in each of one or two transmission paths, and the branched transmission signal may be connected to a plurality of antennas.

On the other hand, a switch-type splitter or power divider is embedded in RFIC corresponding to the RFIC 1250. Accordingly, a separate component does not need to be placed outside, thereby improving component mounting performance. In detail, a transmitter (TX) of two different communication systems can be selected by using a single pole double throw (SPDT) type switch provided in the RFIC corresponding to the controller.

In addition, the electronic device or the vehicle capable of operating in a plurality of wireless communication systems according to an implementation may further include a duplexer 231, a filter 232, and a switch 233.

The duplexer 231 may be configured to separate a signal in a transmission band and a signal in a reception band from each other. In this case, the signal in the transmission band transmitted through the first and second power amplifiers 210 and 220 may be applied to the antennas ANT1 and ANT4 through a first output port of the duplexer 231. On the contrary, the signal in the reception band received through the antennas ANT1 and ANT4 may be received by the low noise amplifiers 210a and 240a through a second output port of the duplexer 231.

The filter 232 may be configured to pass a signal in a transmission band or a reception band and to block a signal in a remaining band. In this case, the filter 232 may include a transmission filter connected to the first output port of the duplexer 231 and a reception filter connected to the second output port of the duplexer 231. Alternatively, the filter 232 may be configured to pass only the signal in the transmission band or only the signal in the reception band according to a control signal.

The switch 233 may be configured to transmit only one of a transmission signal and a reception signal. In an implementation of the present disclosure, the switch 233 may be configured in a single-pole double-throw (SPDT) form to separate the transmission signal and the reception signal in a time division duplex (TDD) scheme. In this case, the transmission signal and the reception signal may be in the same frequency band, and thus the duplexer 231 may be implemented in a form of a circulator.

Meanwhile, in another implementation of the present disclosure, the switch 233 may also be applied to a frequency division multiplex (FDD) scheme. In this case, the switch 233 may be configured in the form of a double-pole double-throw (DPDT) to connect or block a transmission signal and a reception signal, respectively. On the other hand, since the transmission signal and the reception signal can be separated by the duplexer 231, the switch 233 may not be necessarily required.

Meanwhile, the electronic device or the vehicle according to the present disclosure may further include a modem 1400 corresponding to the controller. In this case, the RFIC 1250 and the modem 1400 may be referred to as a first controller (or a first processor) and a second controller (a second processor), respectively. On the other hand, the RFIC 1250 and the modem 1400 may be implemented as physically separated circuits. Alternatively, the RFIC 1250 and the modem 1400 may be logically or functionally distinguished from each other on one physical circuit.

The modem 1400 may perform controlling of signal transmission and reception and processing of signals through different communication systems using the RFID 1250. The modem 1400 may acquire control information from a 4G base station and/or a 5G base station. Here, the control information may be received through a physical downlink control channel (PDCCH), but may not be limited thereto.

The modem 1400 may control the RFIC 1250 to transmit and/or receive signals through the first communication system and/or the second communication system for a specific time interval and from frequency resources. Accordingly, the RFIC 1250 may control transmission circuits including the first and second power amplifiers 210 and 220 to transmit a 4G signal or a 5G signal in the specific time interval. In addition, the RFIC 1250 may control reception circuits including the first to fourth low noise amplifiers 210a to 240a to receive a 4G signal or a 5G signal in the specific time interval.

Hereinafter, the antenna module (i.e., antenna system) that is mounted in the vehicle and the vehicle having the same according to FIGS. 2 to 4 will be described. The antenna system mounted in the vehicle may require a frequency coverage of 600 MHz to 3.8 GHz. In the case of a cone antenna that includes a cone radiator having a circular aperture and a metal patch, the frequency coverage may be 600 MHz to 2 GHz, which is not easy to cover the full frequency range. A detailed description thereof will be given with reference to FIGS. 5A to 6B.

Meanwhile, the necessity of implementing a single broadband antenna in the broadband antenna system for the vehicle according to the present disclosure will be described as follows. It may be difficult to cover a full operating frequency range by use of a single antenna. Therefore, antennas for vehicle must be classified into antennas operating in respective operating frequency bands, for example, a low band (LB), a middle band (MB) and a high band (HB). Therefore, a mounting space issue is caused due to arrangement of plural antennas in the vehicle, and development of a broadband antenna technology for miniaturization is required. In order to solve these problems, the present disclosure desires to propose an antenna structure having an optimal radiator structure providing several resonance modes.

Figure 5A:
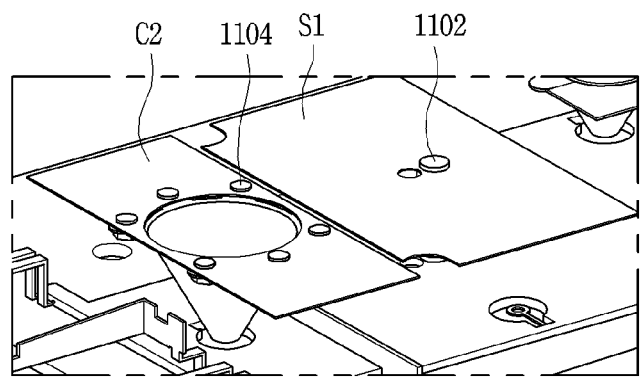
FIG. 5A is a view illustrating a cone antenna having a shorting pin and a metal patch according to one example.
Figure 5A:
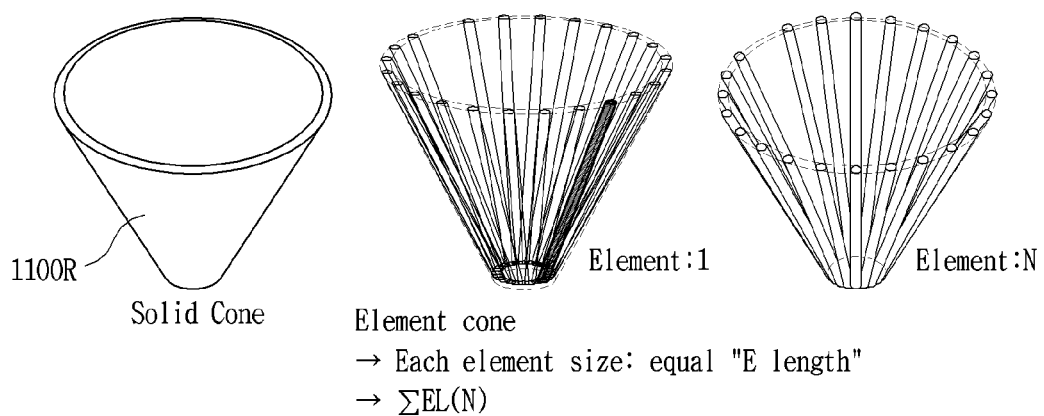
Figure 5B:
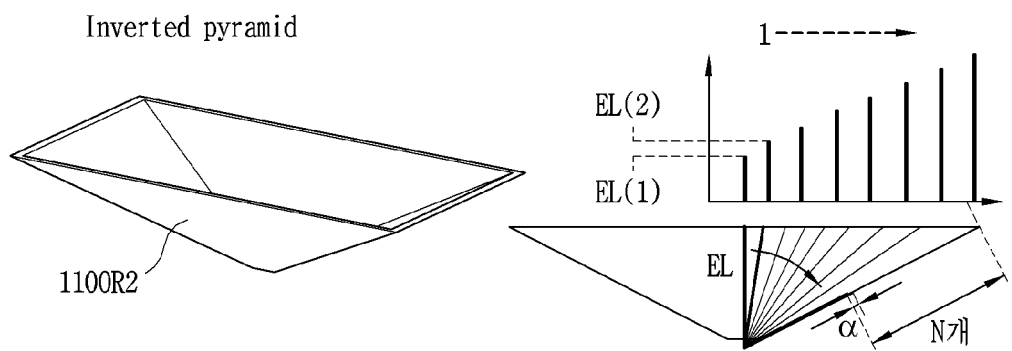
FIG. 5B is a view illustrating a cone radiator in the form of an inverted-pyramid applicable to a cone antenna.
Figure 6A:
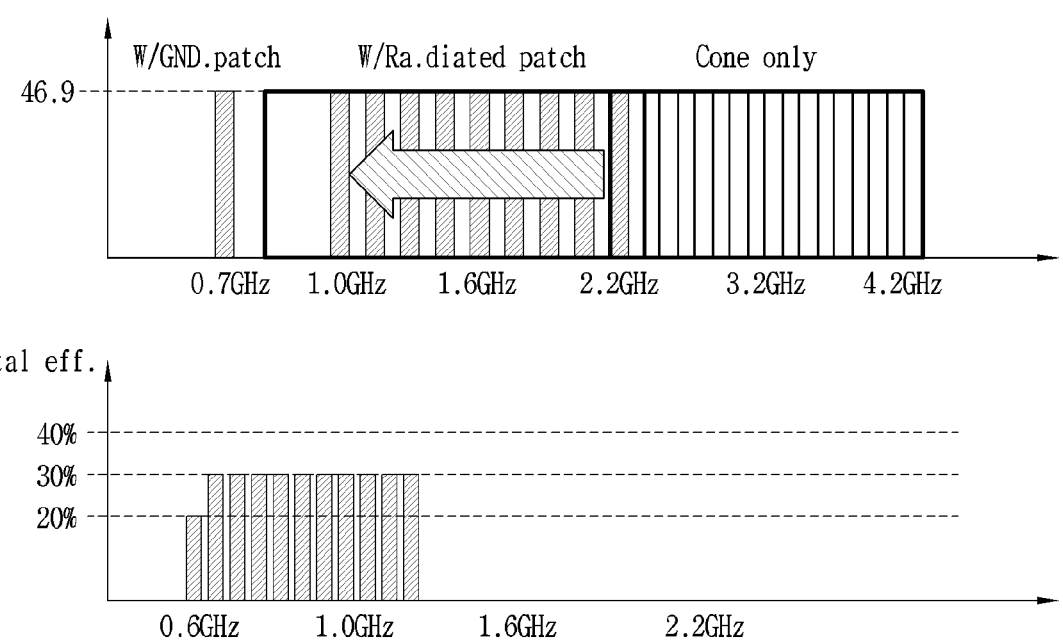
FIGS. 6A and 6B are graphs showing radiation efficiencies and total efficiencies according to frequency changes in the cone antenna structures of FIGS. 5A and 5B.
Figure 6B:
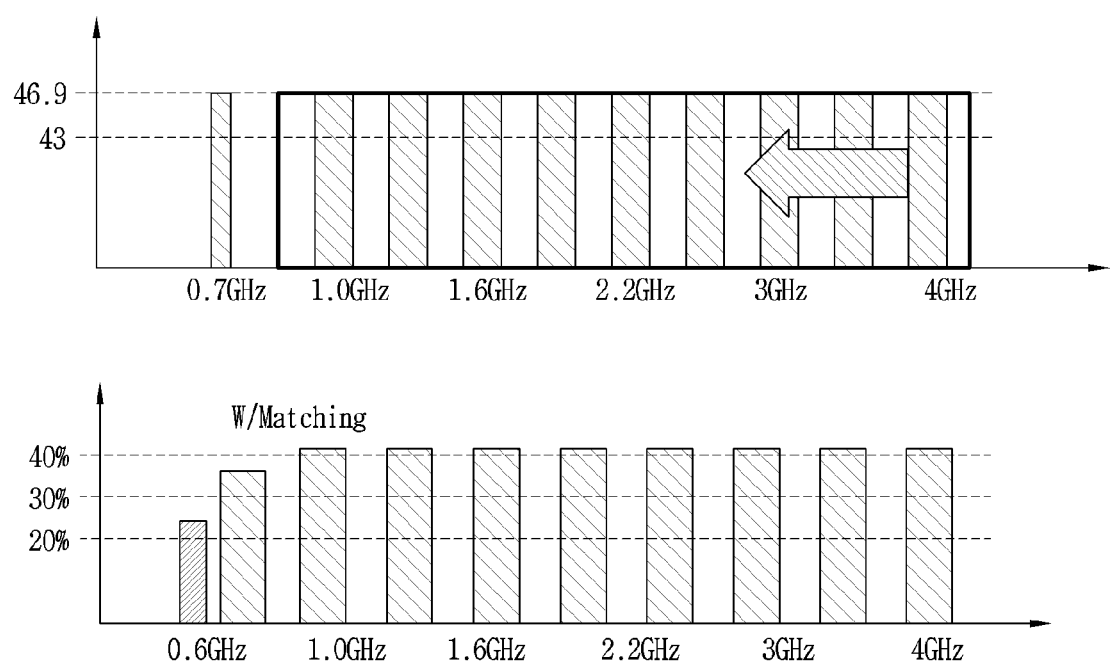

In this regard, FIG. 5B is a view illustrating a cone antenna having a shorting pin and a metal patch according to one example. FIG. 5B is a view illustrating a cone radiator in the form of an inverted-pyramid applicable to a cone antenna. FIGS. 6A and 6B are graphs showing radiation efficiencies and total efficiencies according to frequency changes in the cone antenna structures of FIGS. 5A and 5B.

Referring to FIG. 5A, a cone antenna may be implemented by a cone radiator 1100R and a metal patch coupled to the cone radiator. The metal patch may be configured by a plurality of metal patches. In this regard, the metal patch may include a stack patch C2 that is a metal patch directly connected to the cone radiator, and a coupling patch S1 separated from the stack patch C2. The coupling patch S1 may be disposed adjacent to the stack patch C2 at a predetermined distance, and may be coupled to signals from the stack patch C2. The cone radiator 1100R may be connected to the stack patch C2 through a plurality of outer rims 1104. A multi-wing structure such as the plurality of outer rims 1104 may enable multi-resonance of the cone antenna, such that the cone antenna can have broadband characteristics.

The cone antenna may also operate in the low band LB by a shorting pin 1102 that is connected between the metal patch, for example, the coupling patch S1 and the lower substrate. A ground layer of the lower substrate and the metal patch, for example, the coupling patch S1 may be connected by the shorting pin 1102. The shorting pin 1102 that is a ground connection structure can increase an electrical length of the metal patch and reduce a size of the cone antenna. Accordingly, the cone antenna having the shorting pin 1102 and the metal patch can operate in frequency bands down to the low band LB by virtue of the shorting pin 1102.

Meanwhile, the cone radiator 1100R may be implemented in a conical shape having a predetermined thickness, and this may be referred to as a solid cone. In order to model such conical or pyramidal radiator and to analyze antenna characteristics thereof, the radiator may be approximated by a structure having a plurality of metal elements. In this regard, the cone radiator 1100R may be approximated by a plurality of metal elements EL(n) having the same size.

Referring to FIG. 5B, the radiator 1100R2 having an inverted-pyramidal shape may be approximated by a plurality of metal elements EL(n) having different sizes. In this regard, as n increases, the values of EL(1), EL(2), . . . , EL(N) may be modeled to increase. In addition, the values of EL(1), EL(2), . . . , EL(N) may be modeled to increase at a uniform rate. Accordingly, the radiator 1100R2 having the inverted-pyramidal shape may be modeled so that an increase ratio α has a uniform value.

In this regard, an antenna that covers a full band from about 600 MHz to 3.8 GHz may be required. In this regard, referring to FIGS. 5A and 6A, in a case (Cone only) in which only the cone radiator 1100R exists, the cone antenna may operate in the high band HB. On the other hand, the cone antenna may operate in the middle band MB and the high band HB by the metal patch coupled to the cone radiator 1100R. That is, the cone antenna may operate in the middle band MB and the high band HB in the case (W/Radiated patch) in which both the cone radiator 1100R and the metal patch exist.

In order for the cone antenna to operate even in the low band LB, the shorting pin 1102 may be disposed to connect the metal patch and the lower substrate. Accordingly, the cone antenna can operate in the full band from the low band LB to the high band HB by the metal patch coupled to the cone radiator 1100R and the shorting pin 1102. That is, the cone antenna can operate in the full band from the low band LB to the high band HB in the case (W/GND. patch) in which the cone radiator 1100R, the metal patch, and the shorting pin 1102 exist.

However, the cone antenna having the cone radiator 1100R, the metal patch, and the shorting pin 1102 may operate only in about 610 MHz to 2.5 GHz. In this regard, referring to FIG. 6A, it can be confirmed according to a result of a resonance mode analysis that the cone antenna has a broadband characteristic focused on a specific frequency rather than resonance modes covering a full frequency band. Therefore, it may not be easy to implement an antenna that covers the full band from 600 MHz to 3.8 GHz by a technique such as impedance matching.

On the other hand, radiation efficiency of the cone antenna including the cone radiator 1100R, the metal patch, and the shorting pin 1102 may be a value theoretically less than or equal to a threshold value. Referring to FIG. 6A, the theoretical threshold value of radiation efficiency may be 46.9%. However, the threshold of radiation efficiency may not be limited thereto, and may change depending on an operating bandwidth, conductivity of a cone radiator, and permittivity and loss of a substrate.

Also, total efficiency may be calculated as a changed value in consideration of a return loss, namely, a voltage standing wave ratio (VSWR) of the cone antenna. The total efficiency of the cone antenna may be designed to have a value of about 20% to 30% in the low band LB.

Referring to FIGS. 5A and 6A, the inverted-pyramidal radiator 1100R2 may be modeled by metal elements having different element sizes, so that resonance modes can be formed in several bands corresponding to the different element sizes. In this regard, while the cone radiator 1100R has a symmetrical structure of the same length, the inverted-pyramidal radiator 1100R2 may have a left-right symmetrical structure of different lengths.

It can be seen that the cone antenna having the inverted-pyramidal radiator 1100R2 implements multiple resonance modes to cover the full band from about 600 MHz to 3.8 GHz. Therefore, an antenna that covers the full band from 600 MHz to 3.8 GHz by a technique such as impedance matching can be implemented.

On the other hand, radiation efficiency of the cone antenna including the inverted-pyramidal cone radiator 1100R2, the metal patch, and the shorting pin 1102 may be a value theoretically less than or equal to a threshold value. Referring to FIG. 6A, the theoretical threshold value of radiation efficiency may be 46.9%. However, the threshold of radiation efficiency may not be limited thereto, and may change depending on an operating bandwidth, conductivity of a cone radiator, and permittivity and loss of a substrate.

Also, total efficiency may be calculated as a changed value in consideration of a return loss, namely, a voltage standing wave ratio (VSWR) of the cone antenna. The total efficiency of the cone antenna may have a value of 20% or more even in the low band LB. In particular, in most of the low band LB, the total efficiency may be designed to have a value of 30% or more. Meanwhile, in the middle band MB and high band (HB) of 1 GHz or more, in particular, in the band up to 3.8 GHz, the total efficiency may be calculated to have a value of 40% or more.

Figure 7A:
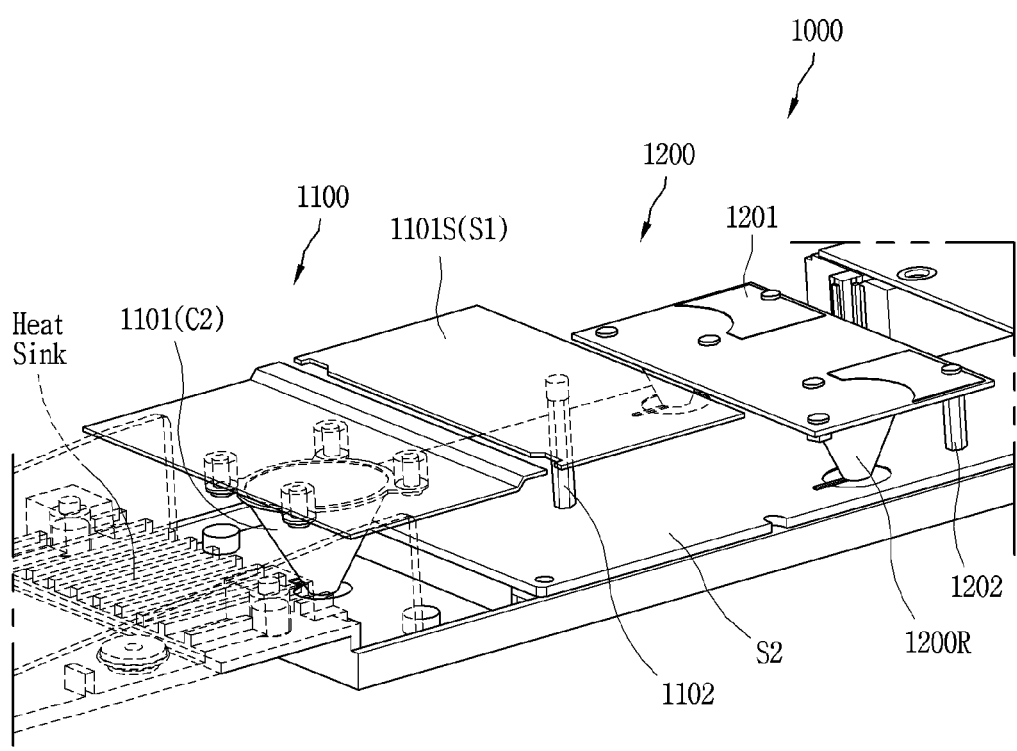
FIG. 7A is a perspective view illustrating an antenna system including a first antenna and a second antenna in accordance with one implementation.
Figure 7B:
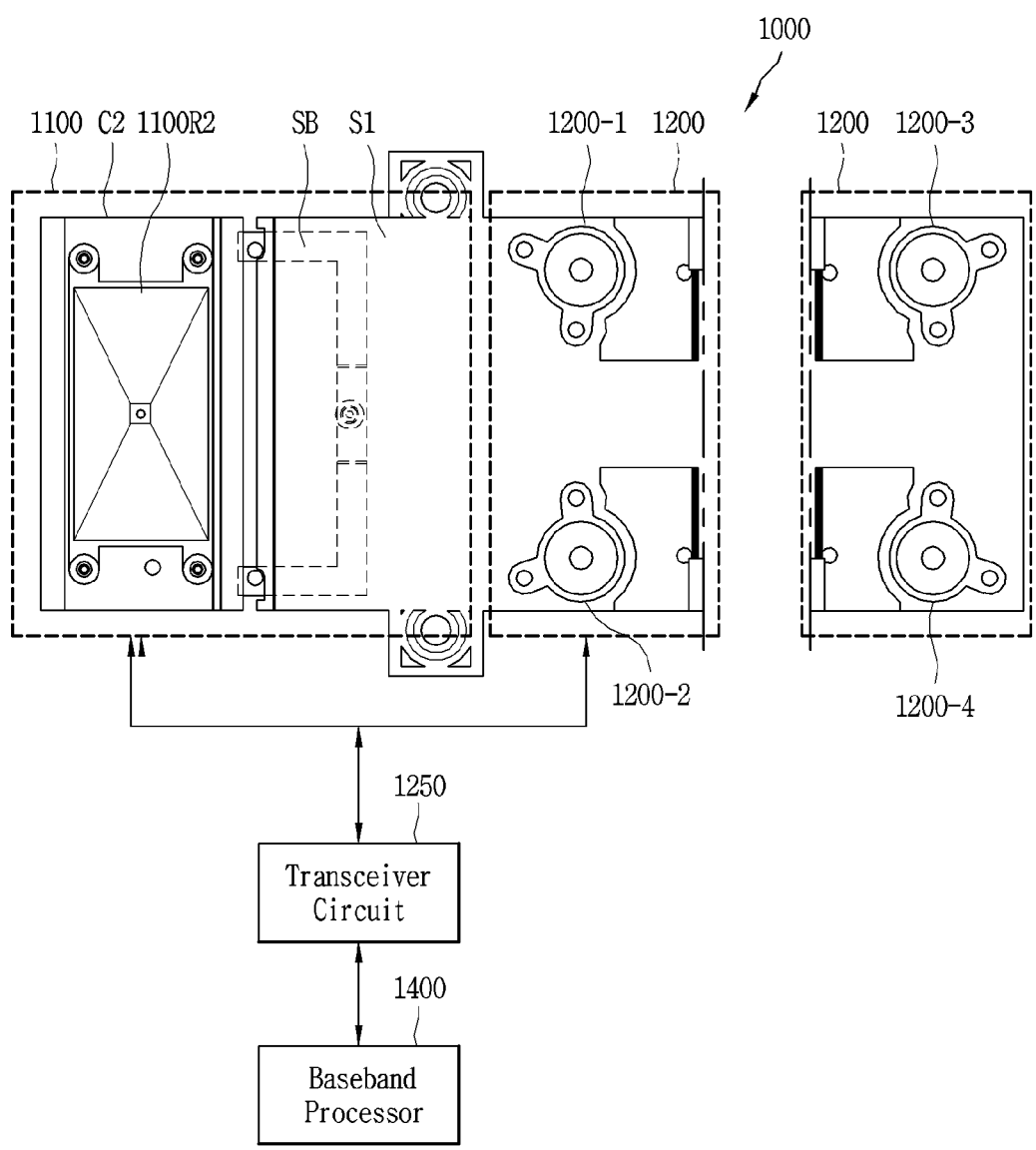
FIG. 7B is a front view illustrating the antenna system including the first antenna and the second antenna.

Meanwhile, the antenna module (i.e., antenna system) according to the present disclosure may include a plurality of antennas in addition to the low band (LB) antenna. FIG. 7A is a perspective view illustrating an antenna system including a first antenna and a second antenna in accordance with one implementation. FIG. 7B is a front view illustrating the antenna system including the first antenna and the second antenna.

Figure 8A:
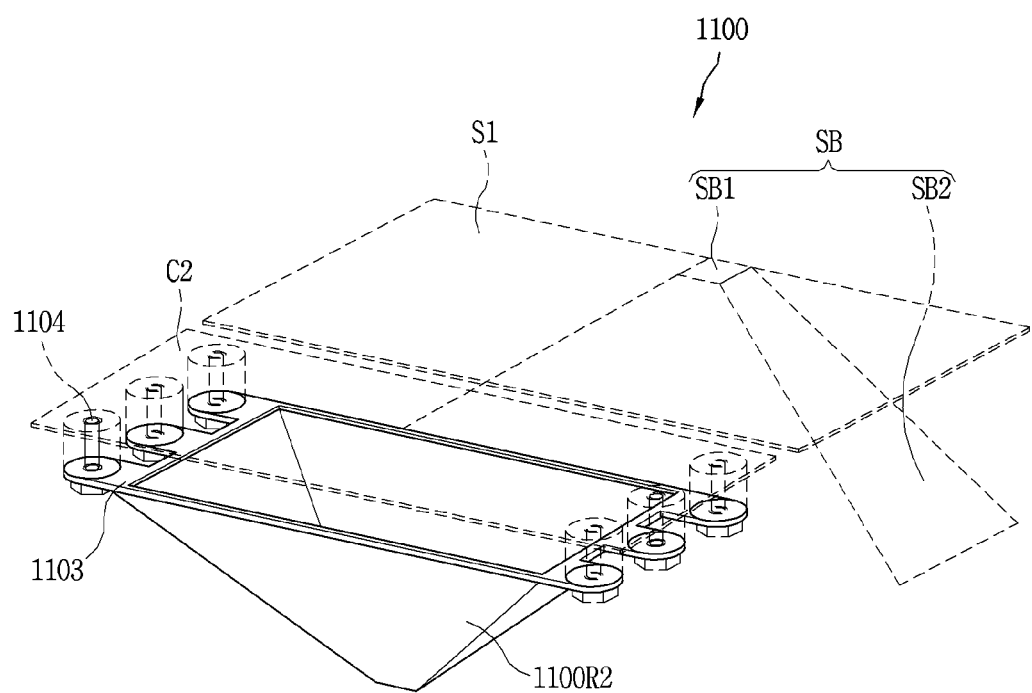
FIG. 8A is a perspective view illustrating a cone antenna having a metal patch connected to a shorting bar, as viewed in a specific direction, according to one implementation.
Figure 8B:
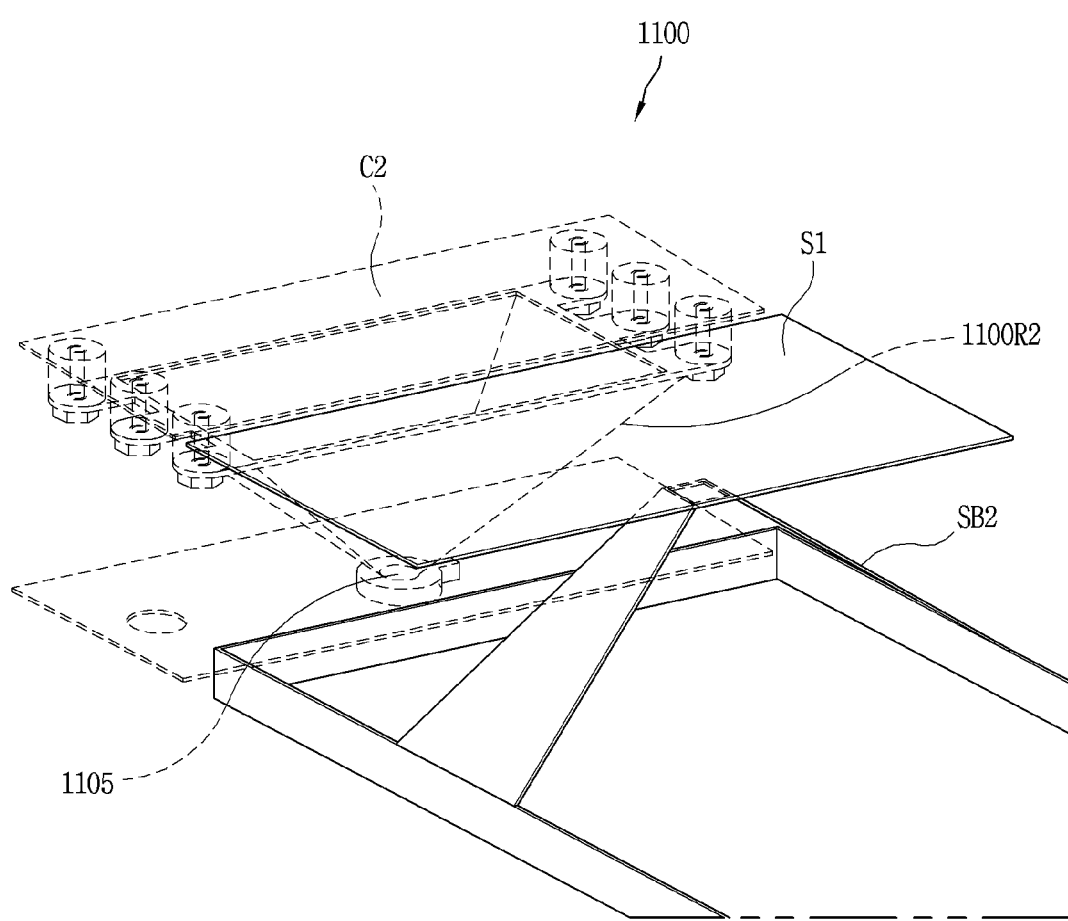
FIG. 8B is a perspective view illustrating the cone antenna having the metal patch connected to the shorting bar, as viewed in another direction, according to the one implementation.

On the other hand, an antenna implemented by a metal frame according to the present disclosure can extend a bandwidth through a broadband matching structure. FIG. 8A is a perspective view illustrating a cone antenna having a metal patch connected to a shorting bar, as viewed in a specific direction, according to one implementation. FIG. 8B is a perspective view illustrating the cone antenna having the metal patch connected to the shorting bar, as viewed in another direction, according to the one implementation.

Hereinafter, requirements for the inverted-pyramidal antenna and the antenna system mounted in the vehicle related thereto will be described.

Vehicle antenna requirements: Mean gain of −2 dBi at low elevation, i.e., 70 to 90 degrees of elevation.

Limitations of the related art: With an antenna technology using an inner space of a module, it is difficult to satisfy antenna performance requirements due to performance degradation caused by a low antenna height.

Necessity of the present disclosure: An antenna structure is required to improve antenna performance without an additional increase in height to secure antenna performance.

Referring to FIGS. 7A to 8B, the antenna system mounted in the vehicle may include a first antenna 1100 operating in the low band LB and a second antenna 1100 operating in the middle band MB and the high band HB. Here, the first antenna 1100 may operate in a band including 650 MHz to 900 MHz or 600 MHz to 960 MHz, which is the low band LB. However, the low band LB may not be limited thereto and may vary depending on applications. The second antenna 1200 may operate in the middle band MB starting from 1400 MHz and the high band HB which is a higher frequency band than the middle band MB.

The antenna system mounted in the vehicle may include a transceiver circuit 1250 for controlling a signal to be radiated through at least one of the first antenna 1100 and the second antenna 1200. In addition, the antenna system mounted in the vehicle may further include a baseband processor 1400 configured to perform communication with at least one of an adjacent vehicle, a Road Side Unit (RSU), and a base station through the transceiver circuit 1250.

Referring to FIG. 7A, the first antenna 1100 operating in the first frequency band, which is the low band LB, may include a metal plate S1, a lower substrate S2, and a shorting pin 1102. Meanwhile, the operating frequency band of the first antenna 1100 may extend to the middle band MB and the high band HB in addition to the low band LB. To this end, the first antenna 1100 may include a metal plate S1, a lower substrate S2, a shorting pin 1102, and a coupling patch C2 to which a cone radiator is connected.

In this regard, the metal plate S1 may define a part of the exterior of the antenna system and may act as a radiator. The lower substrate S2 may be disposed under the metal plate S1, and the transceiver circuit 1250 and the baseband processor 1400 may be disposed on the lower substrate S2.

On the other hand, since the antenna system is mounted to a roof or roof frame of the vehicle, heat generation may occur greatly depending on an external environment, the operation of the vehicle, and the operation of the antenna system. To solve this problem, the lower substrate S2 may be coupled to a vehicle frame through a heat sink, instead of being directly coupled to the vehicle frame. Accordingly, the lower substrate S2 may include a screw fastening hole and a heat sink fastening hole.

On the other hand, the first antenna 1100 may further include a second metal plate C2 for bandwidth extension. Here, the second metal plate C2 may be disposed adjacent to the metal plate S1 to be coupled with signals from the metal plate S1, and allow the first antenna 1100 to operate in a broad frequency band. Accordingly, the first antenna 1100 can operate in a first frequency band that is the low band LB and a second frequency band that is higher than the first frequency band. This can allow the first antenna 1100 to operate in a band including 600 MHz to 3.8 GHz. To this end, the second metal plate C2 of the first antenna 1100 may be connected to the cone radiator.

In order to further extend the operating frequency band of the first antenna 1100, the cone radiator may be configured in an inverted-pyramidal shape. Referring to FIGS. 7B to 8B, the first antenna 1100 may include a radiator 1100R2, a coupling patch S1, a stack patch C2, and a shorting bar SB.

On the other hand, the radiator 1100R2 may not be limited to the inverted-pyramidal radiator having a rectangular aperture. The radiator may be implemented as a cone radiator having a circular aperture as illustrated in FIG. 7A. Accordingly, upper and lower apertures of the radiator may be formed in a circular, oval, or polygonal shape. In this regard, a signal applied from a feeding line through the lower aperture may be transmitted to the upper aperture through the inside of the radiator and coupled to the stack patch C2 corresponding to a metal patch.

Referring to FIGS. 7B to 8B, the radiator 1100R2 may allow a signal applied through the lower aperture to be transmitted through the upper aperture. In this regard, the upper aperture and the lower aperture may be formed in a rectangular shape, and the radiator 1100R2 may be configured as a pyramidal radiator in which the upper aperture is larger than the lower aperture in size. In this case, the coupling patch S1 may have a rectangular shape.

The coupling patch S1 may be disposed on the upper substrate to be spaced apart from the upper aperture by a predetermined distance so that a signal transmitted to the upper aperture can be coupled. In addition, the stack patch C2 may be disposed on the upper substrate to be spaced apart from the coupling patch S1 by a predetermined distance. In this case, the stack patch C2 may be disposed to be spaced apart from the upper aperture by a predetermined height so that a signal transmitted to the upper aperture can be coupled. Accordingly, the signal radiated through the upper aperture of the radiator 1100R2 can be coupled to the upper stack patch C2. In addition, the first antenna 1100 can operate in a wider frequency band through the coupling patch S1 spaced apart from the stack patch C2 by the predetermined distance.

A feeder 1105 may be disposed on the front surface of the lower substrate to transmit a signal to the radiator 1100R2. The feeder 1105 may be connected to the transceiver circuit 1250, and a matching circuit for impedance matching between the feeder 1105 and the transceiver circuit 1250 may be disposed.

Meanwhile, outer rims 1104 integrally formed with the pyramidal radiator 1100R2 and the upper substrate may be connected by screws. In this case, a multi-wing structure constituting the outer rims 1104 can allow the first antenna 1100 to resonate at multiple frequencies.

The multi-wing structure may include wings disposed at upper left, lower left, upper right, and lower right of the pyramidal radiator 1100R2. In one example, as illustrated in FIG. 7B, the multi-wing structure may include four wings integrally formed with the rim of the upper aperture of the pyramidal radiator 1100R2. The outer rims 1104 having the multi-wing structure can allow the first antenna to resonate at multiple frequencies.

On the other hand, the number of the wings constituting the multi-wing structure may not be limited to four, but may change to six, eight, and the like depending on applications. In order to increase the number of multi-resonance points, the number of the wings constituting the multi-wing structure may be expanded to 6, 8, etc.

Referring to FIG. 8A, the multi-wing structure may include wings disposed at upper left, left center, lower left, upper right, right center, and lower right of the pyramidal radiator 1100R2. Accordingly, the multi-wing structure may include six wings integrally formed with the rim of the upper aperture of the pyramidal radiator 1100R2. Therefore, the first antenna can resonate at more frequencies when having the multi-wing structure with six wings than when having the multi-wing structure with four wings.

Meanwhile, the shorting bar SB may be connected in surface-contact with the coupling patch S1 and connect a ground layer of the lower substrate. Specifically, the shorting bar SB may include a connection part SB1 and an extension part SB2. The connection part SB1 may be connected to one region inside the coupling patch S1. In addition, the extension part SB2 may be bent from the connection part SB1 at a predetermined angle. In this case, a terminated portion of the extension part SB2 may be connected to the ground layer of the lower substrate.

The shorting bar SB may be connected to the ground layer of the lower substrate to reduce the size of the coupling patch S1. In addition, the shorting bar SB having a tapered structure can cause multi-resonance, and accordingly, the bandwidth of the first antenna 1100 can extend.

Hereinafter, the requirements for the antenna system mounted in the vehicle and the necessity of the broadband matching structure, for example, the shorting bar SB as illustrated in the present disclosure will be described.

Vehicle antenna requirements: A frequency coverage from 600 MHz to 3.8 GHz is required.

Limitations of the related art: In order to satisfy a frequency coverage of 600 MHz to 960 MHz as an ODM requirement, a matching circuit and a matching device value that are difficult to be applied in practice are required. Due to the difficulty of implementing such a matching circuit, a mismatch loss occurs in a VSWR of 5:1, and improvement of the mismatch loss is required.

Necessity of the present disclosure: A low elevation gain characteristic required by ODM is −2 dBi in the range of 70 to 90 degrees based on the elevation. On the other hand, it is necessary to improve performance by about 3 dB at 600 MHz in a VSWR of 5:1, that is, a return loss of −5 dB. Therefore, the present disclosure may require a structure capable of improving broadband antenna matching characteristics in the frequency coverage of 600 MHz to 960 MHz. In addition, an antenna operating in a frequency band of 600 MHz to 3.8 GHz can be implemented through a coupling structure between a metal patch and a radiator such as a cone radiator or an inverted-pyramidal radiator.

Figure 9:
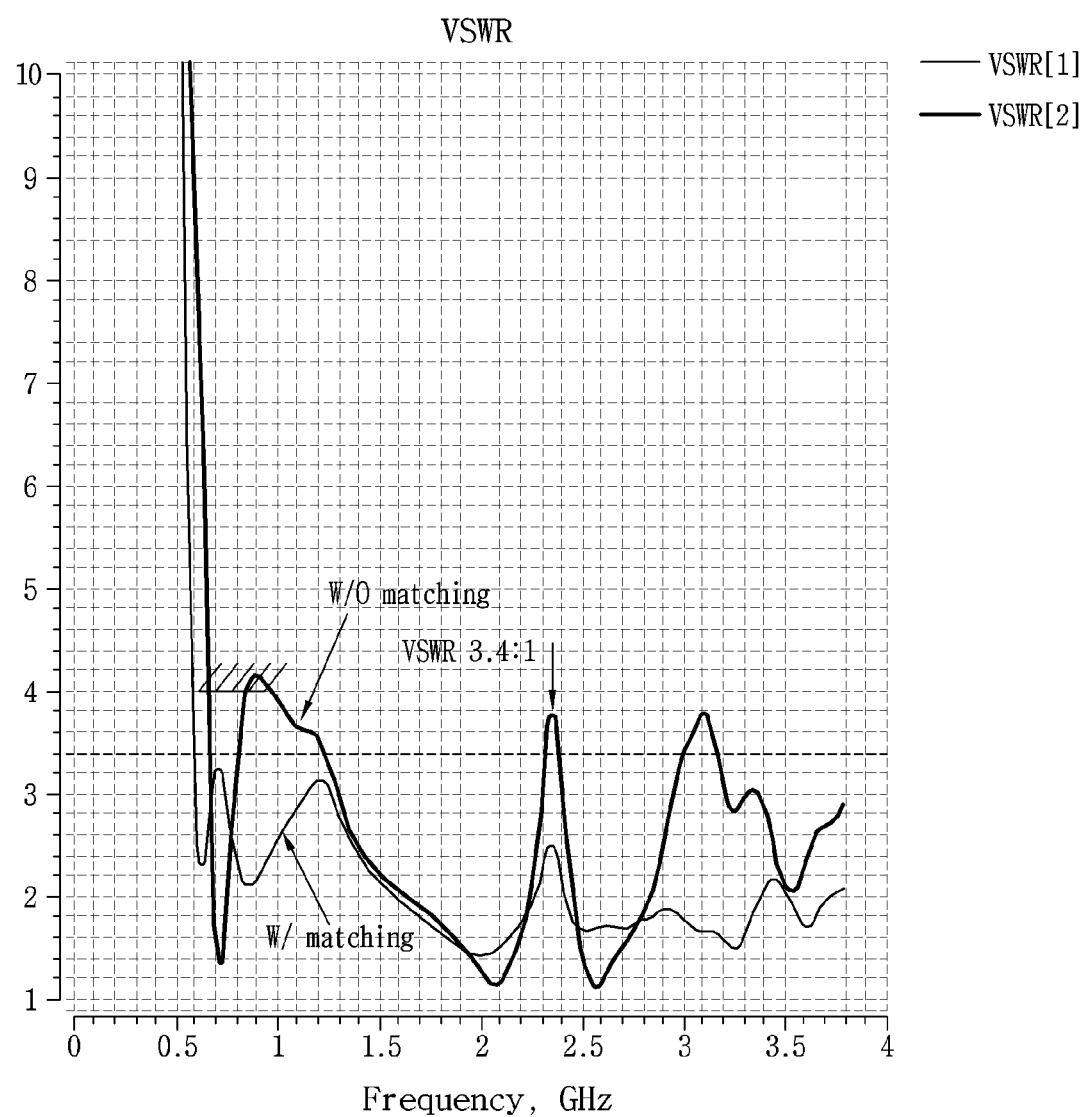
FIG. 9 is a view illustrating a VSWR result of the first antenna according to presence or absence of a matching stub according to one implementation.

FIG. 9 is a view illustrating a VSWR result of the first antenna according to presence or absence of a matching stub according to one implementation. That is, FIG. 9 illustrates a voltage standing wave ratio (VSWR) of the first antenna according to presence or absence of the shorting bar. In this regard, VSWR[1] may indicate a VSWR result of the first antenna when there is a broadband matching structure such as the shorting bar. On the other hand, VSWR[2] may indicate a VSWR result of the first antenna when there is not a broadband matching structure such as the shorting bar. Referring to FIG. 9, it can be seen that the VSWR is improved in the full band including the low band LB, the middle band MB, and the high band HB when the broadband matching structure such as the shorting bar exists.

Figure 10A:
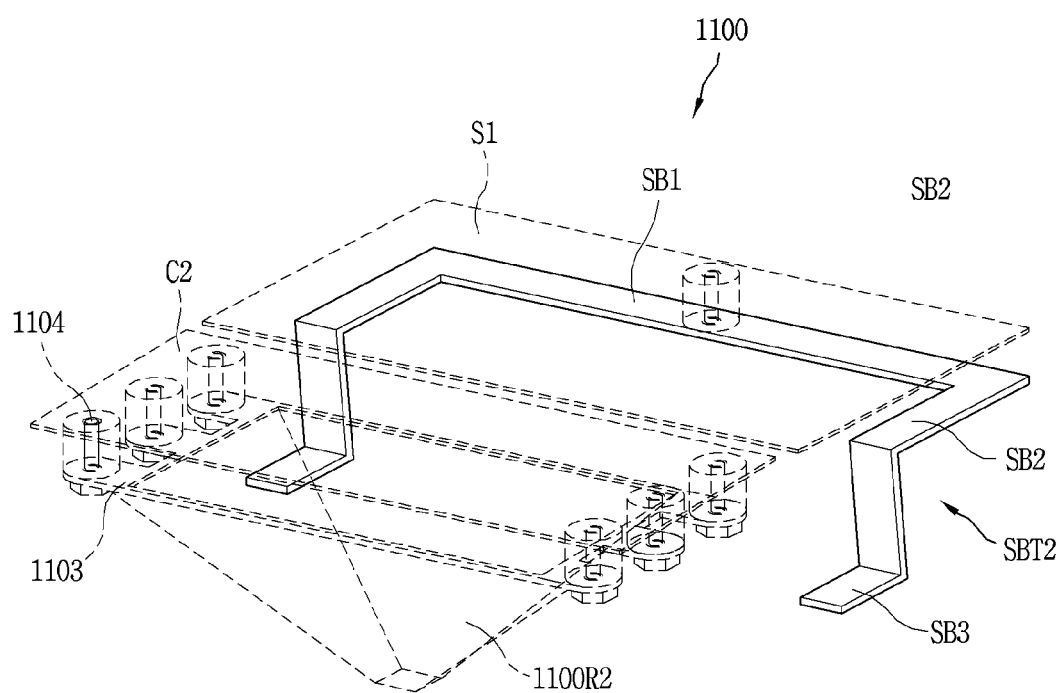
FIGS. 10A and 10B are views illustrating a configuration in which a shorting bar is connected to a coupling patch according to one example.
Figure 10B:
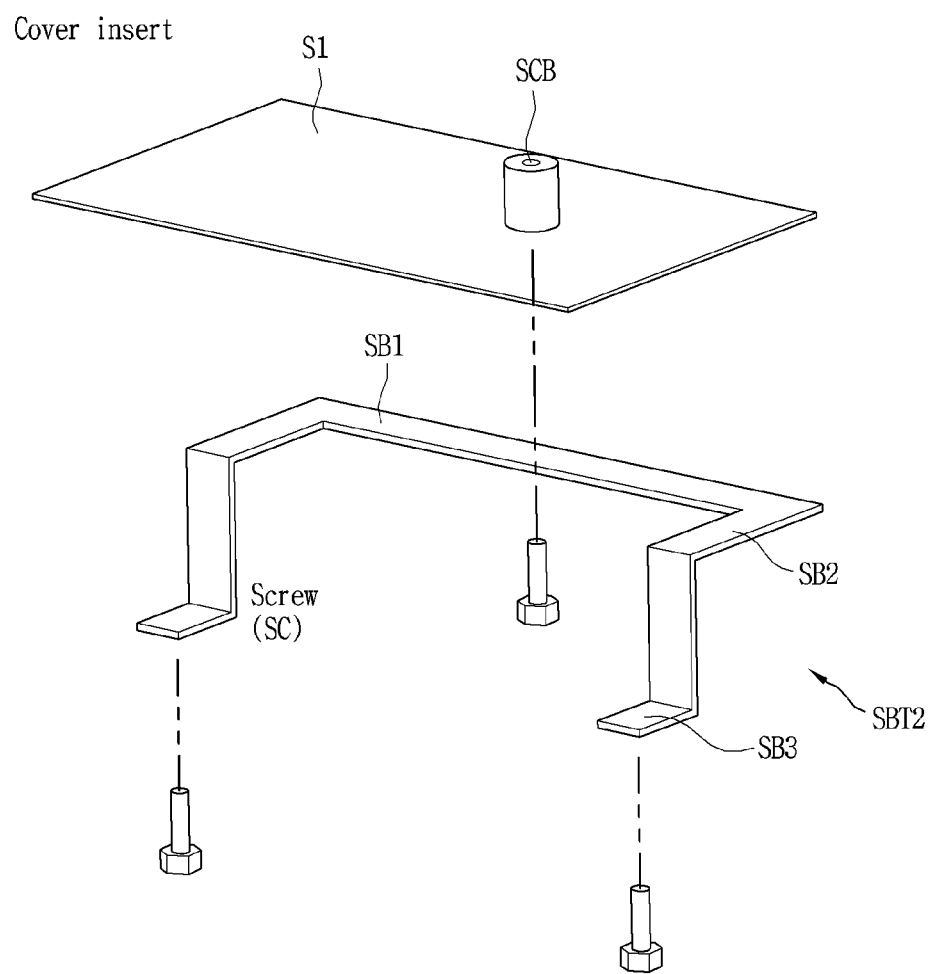

Therefore, a matching technique using a structure by a shorting bar may be used for overcoming the limitation of impedance matching. Specifically, a matching range tuning effect can be obtained according to heights of shorting bars having various shapes. FIGS. 10A and 10B are views illustrating a configuration in which a shorting bar is connected to a coupling patch according to one example.

Referring to FIGS. 10A and 10B, the shorting bar SB may include a connection part SB1 connected to one region inside the coupling plate S1 and extension parts SB2 bent from the connection part SB1 at predetermined angles. The shorting bar SB may further include fastening parts SB3 formed at terminated portions of the extension parts SB2 and fastened to the lower substrate. The connection part SB1 may be connected to the coupling patch S1 by inserting a screw into a screw boss SCB formed at the coupling patch S1.

The connection part SB1 of the shorting bar SB may have a predetermined length up to a position connected to the lower substrate. In this case, the extension parts SB2 of the shorting bar SB may extend orthogonally on the same plane as the connection part SB1. Also, the extension parts SB2 may extend vertically downward from the orthogonally extended ends to be fastened to the fastening parts SB3 that are fastened to the ground layer of the lower substrate.

Here, a second length of the extension part SB2 connected to the fastening part SB3 may be longer than a first length of the extension part SB2 connected to the connection part SB1. Accordingly, the short bar SB may be configured to enable antenna bandwidth extension by multi-resonance. Specifically, the resonant frequency of the first antenna 1100 can be shifted by adjusting the distance from the coupling patch S1 corresponding to a shorted patch to the screw boss and the length of the bending structure. A detailed description thereof will be given later with reference to FIG. 12.

Figure 11:
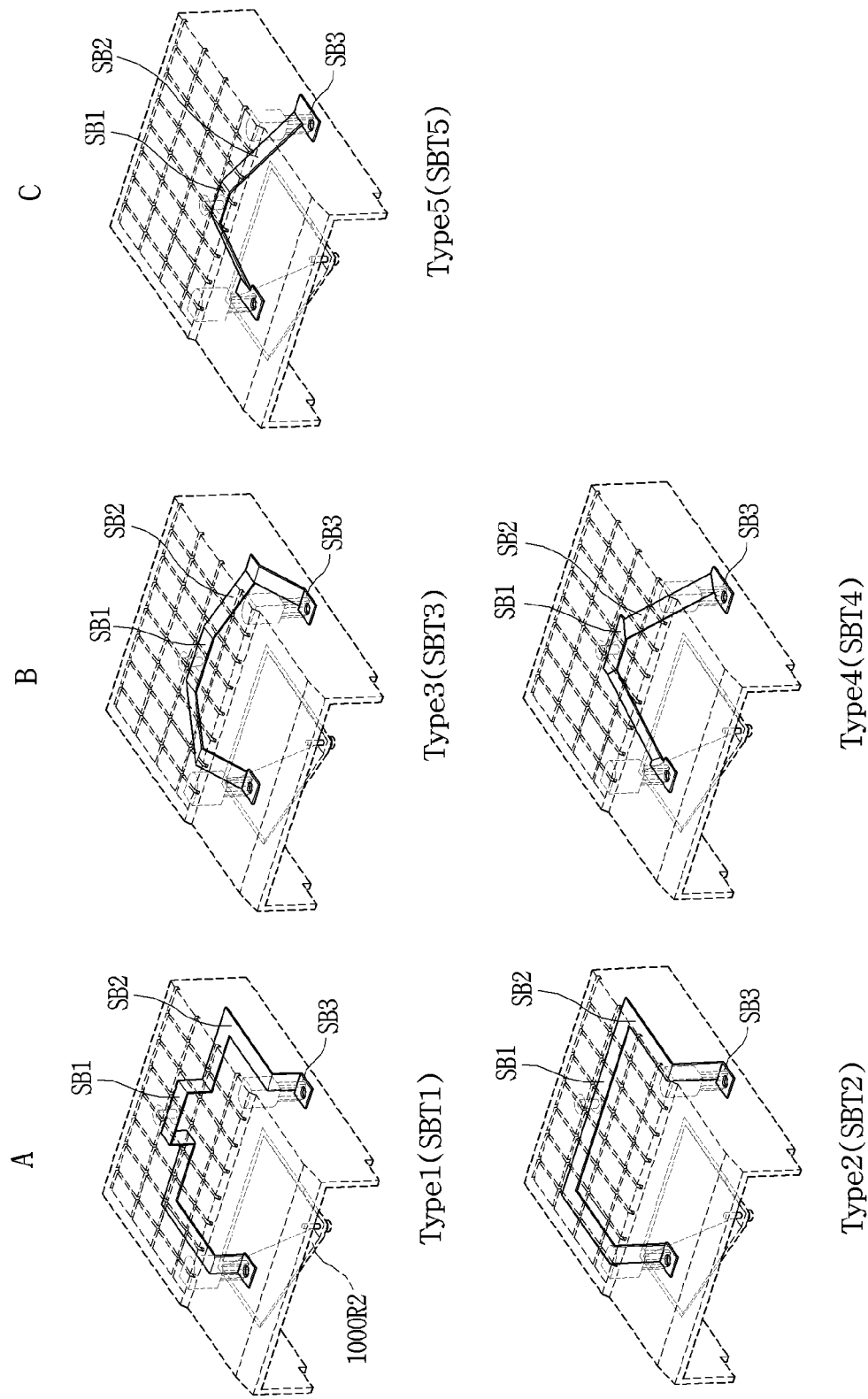
FIG. 11 is a view illustrating a shape of a shorting bar SB, which is a broadband matching structure, according to various implementations.

FIG. 11 is a view illustrating a shape of a shorting bar SB, which is a broadband matching structure, according to various implementations. Referring to FIG. 11, the shorting bar SB, which is the broadband matching structure, may be implemented as Type 1 to Type 5 structures. In this regard, in the antenna system, the first antenna 1100 can be implemented as a patch antenna and also be implemented as a broadband antenna through the shorting bar SB, that is, the broadband matching structure.

Specifically, a resonant frequency of 600 MHz band may change according to a shorting position in the metal plate S1 operating as a patch antenna and a length of a bending structure. In this regard, it may be necessary to change the bending structure of the shorting bar SB, and to apply various tuning points in various bending structures. The shorting position may be 3 points or more, and the bending structure may be needed to change for performance optimization. Here, the shorting position may be one of three points including a point A, a point B, and a point C, as illustrated in FIG. 10. In relation to the bending structure, as illustrated in FIG. 11, it may be one of Type 1 to Type 5.

Specifically, a shorting bar SBT1 of Type 1 may include a connection part SB1 and extension parts SB2 that are connected vertically to the connection part SB1 and then extend perpendicularly. The shorting bar SBT2 may further include fastening parts SB3 formed at terminated portions of the extension parts SB2 and fastened to the shorting pin 1102 and a metal supporter 1106.

A shorting bar SBT2 of Type 2 may include a connection part SB1 electrically connected to the metal plate S1 up to a position of the shorting pin 1102 and the metal supporter 1106. The shorting bar SBT2 may further include the extension parts SB2 vertically connected to the connection part SB1 and disposed parallel to the shorting pin 1102 and the metal supporter 1106. The shorting bar SBT2 may further include fastening parts SB3 formed at terminated portions of the extension parts SB2 and fastened to the shorting pin 1102 and the metal supporter 1106.

A shorting bar SBT3 of Type 3 may include a connection part SB1 and extension parts SB2 that are bent from the connection part SB1 by predetermined angles and then bent again in a different direction by predetermined angles. The shorting bar SBT3 may further include fastening parts SB3 formed at terminated portions of the extension parts SB2 and fastened to the shorting pin 1102 and the metal supporter 1106.

The shorting bar SBT4 of Type 4 may include a connection part SB1 and extension parts SB2 that are bent from the connection part SB1 by predetermined angles. The shorting bar SBT4 may further include fastening parts SB3 formed at terminated portions of the extension parts SB2 and fastened to the shorting pin 1102 and the metal supporter 1106.

The shorting bar SBT5 of Type 5 may include a connection part SB1 and extension parts SB2 that are bent from the connection part SB1 by predetermined angles. The shorting bar SBT5 may further include fastening parts SB3 formed at terminated portions of the extension parts SB2 and fastened to the shorting pin 1102 and the metal supporter 1106.

In this regard, the shorting bar SBT1 of Type 1 and the shorting bar SBT2 of Type 2 may be connected to the point A of the metal frame S1. The shorting bar SBT3 of Type 3 and the shorting bar SBT4 of Type 4 may be connected to the point B of the metal frame S1. The shorting bar SBT5 of Type 5 may be connected to the point C of the metal frame S1.

The shorting bars SB of Type 1 to Type 5 may operate in the full band of 600 MHz to 3.8 GHz through performance optimization tuning.

Therefore, different optimal shorting bars can be applied depending on whether to operate the radiator by the metal plate, among the first antennas only in the low band LB or in the full band. This can result in providing a matching circuit for optimal antenna performance in consideration of vehicle specifications or antenna configuration.

On the other hand, the shorting bar SB, which is the broadband matching structure of Type 1 to Type 5, can be connected to both a first screw boss formed at one point in the metal plate and a second screw boss formed at another point in the metal plate. Accordingly, the length by which the shorting bar SB is in contact with the metal plate can increase, thereby improving bandwidth characteristics of the first antenna 1100.

The shorting bar SB may additionally be connected to a second screw boss SCB formed at another point in the metal plate, in addition to the screw boss SCB formed at one point in the metal plate. In this regard, one shorting bar SB may be connected to both the first screw boss and the second screw boss. Alternatively, a separate shorting bar other than the shorting bar SB connected to the first screw boss may be connected to the second screw boss.

Figure 12A:
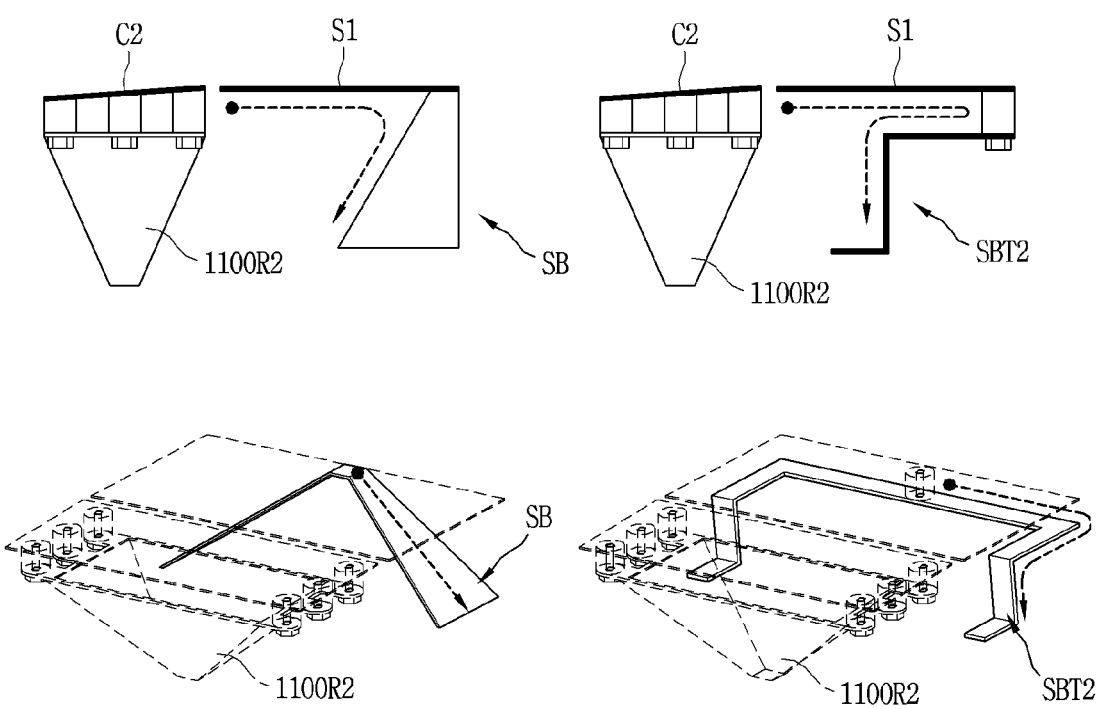
FIG. 12A is a view illustrating an example in which a resonance length is changed according to a different shorting bar structure.

FIG. 12A is a view illustrating an example in which a resonance length is changed according to a different shorting bar structure. Referring to FIG. 12A, when the tapered shorting bar SB is provided, a current path may be formed from one end of the coupling patch S1 to the terminated portion of the shorting bar SB. On the other hand, when the shorting bar SBT2 including the connection part, the extension parts, and the fastening parts is provided, a current path may be formed from one end of the coupling patch S1 to the terminated portion of the shorting bar SB. In this case, the stack patch C2 connected to the radiator 1100R2 may be formed to have a slant of a predetermined angle to correspond to the shape of the roof frame of the vehicle. This can reduce an overall height of the antenna system.

Referring to FIGS. 7B and 8A, the outer rims 1104 integrally formed with the pyramidal radiator 1100R2 and the upper substrate may be connected by screws. In this case, the multi-wing structure constituting the outer rims 1104 can allow the first antenna 1100 to resonate at multiple frequencies.

Meanwhile, the multi-wing structure may include wings disposed at upper left, lower left, upper right, and lower right of the pyramidal radiator 1100R2. In one example, as illustrated in FIG. 7B, the multi-wing structure may include four wings integrally formed with the rim of the upper aperture of the pyramidal radiator 1100R2. The outer rims 1104 having the multi-wing structure can allow the first antenna to resonate at multiple frequencies.

On the other hand, the number of the wings constituting the multi-wing structure may not be limited to four, but may change to six, eight, and the like depending on applications. In order to increase the number of multi-resonance points, the number of the wings constituting the multi-wing structure may be expanded to 6, 8, etc.

Referring to FIG. 8A, the multi-wing structure may include wings disposed at upper left, left center, lower left, upper right, right center, and lower right of the pyramidal radiator 1100R2. Accordingly, the multi-wing structure may include six wings integrally formed with the rim of the upper aperture of the pyramidal radiator 1100R2. Therefore, the first antenna can resonate at more frequencies when having the multi-wing structure with six wings than when having the multi-wing structure with four wings.

Referring to FIGS. 8A and 12A, in the multi-wing structure having six wings, the height of the coupling structure between the outer rims 1104 and the upper substrate may increase as the radiator 1100R2 is adjacent to the second metal plate that is the coupling patch S1. Accordingly, as the height of the coupling structure increases, the first metal plate corresponding to the metal patch C2 on the upper portion of the radiator 1100R2 may be formed at a predetermined inclination. Here, the first metal plate corresponding to the metal patch C2 may be referred to as a stack patch C2.

On the other hand, the stack patch C2 disposed on the upper portion of the radiator 1100R2 may be configured as the first metal plate. Also, the shorting bar SB may be connected to a screw boss formed on one point in the second metal plate corresponding to the coupling patch S1.

As described above, in the first antenna 1100 having the radiator 1100R2, a different current path may be formed according to the type of the shorting bar SB, SBT2 connected to the coupling patch S1. Accordingly, in the first antenna 1100 having the radiator, the resonant frequency may be shifted according to the type of the shorting bar SB, SBT2 and the length of each part.

Figure 12B:
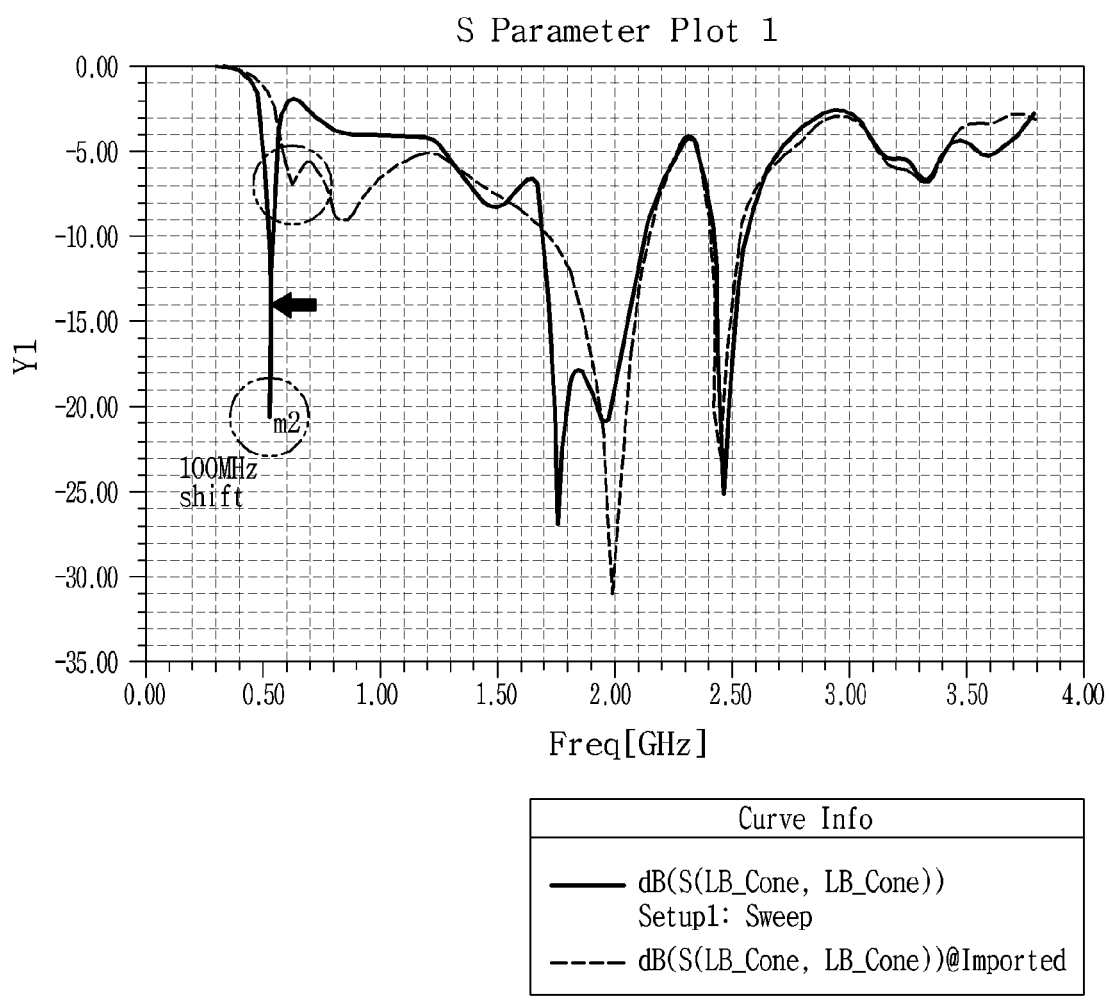
FIG. 12B is a view illustrating a VSWR result according to a shorting bar type.

In this regard, FIG. 12B is a view illustrating a VSWR result according to a shorting bar type. Referring to FIG. 12B, the shorting bar SBT2 including the connection part, the extension parts, and the fastening parts may resonate at a lower frequency as the current path increases. That is, the resonant frequency of the antenna having the shorting bar SBT2 including the connection part, the extension parts, and the fastening parts may be shifted to a lower frequency.

On the other hand, the number of resonant frequencies may increase due to the tapered shorting bar SB. Meanwhile, the current path of the tapered shorting bar SB may decrease, compared to the shorting bar SBT2, which may result in slightly increasing the resonant frequency. However, the number of multi-resonance points may increase and positions of the multi-resonance points may be adjacent to each other. Accordingly, although the resonant frequency slightly increases, the broadband characteristics in the low band LB and the middle band MB can be more enhanced.

In addition, referring to FIGS. 8A, 8B, and 12A, the connection part SB1 of the tapered shorting bar SB may be disposed on an edge region corresponding to one end portion of the coupling patch. Accordingly, the first antenna can resonate up to the first frequency band that is the lower band LB.

Also, referring to FIGS. 10A, 10B, and 12A, the connection part SB1 of the shorting bar SBT2 may be disposed on an edge region corresponding to one end portion of the coupling patch. Accordingly, the first antenna can resonate up to the first frequency band that is the lower band LB.

Figure 13A:
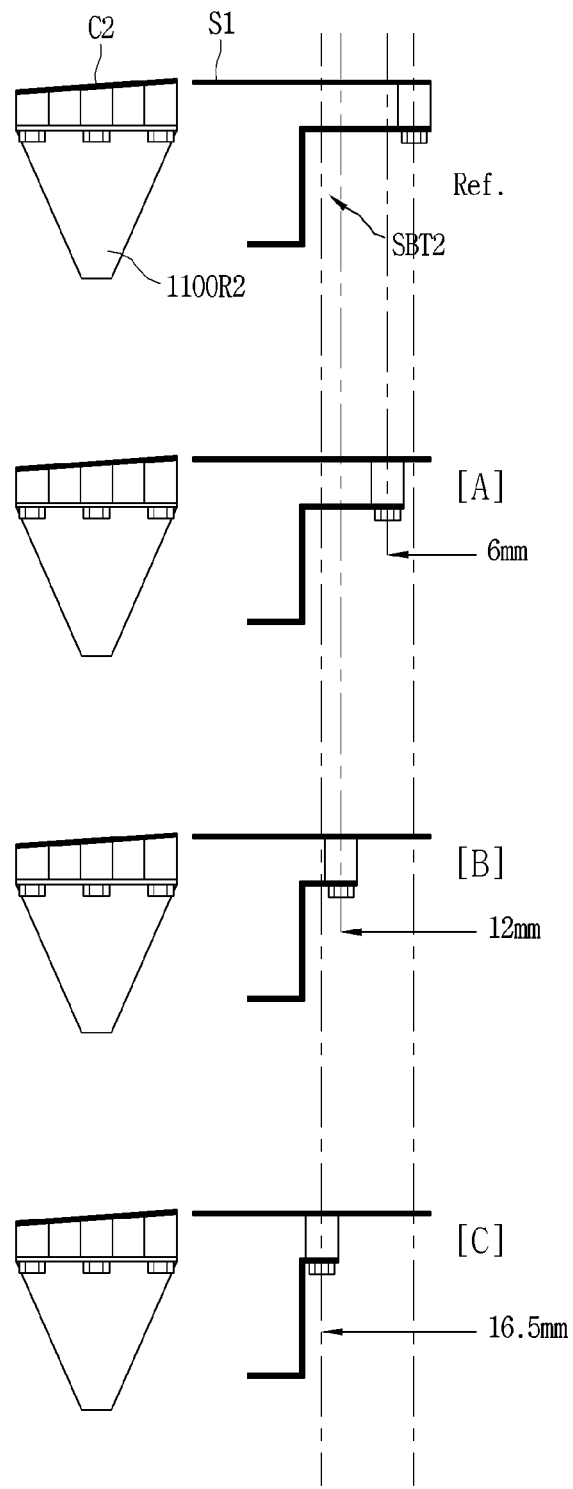
FIG. 13A is a view illustrating a case of changing a length of an extension part according to one implementation.
Figure 13B:
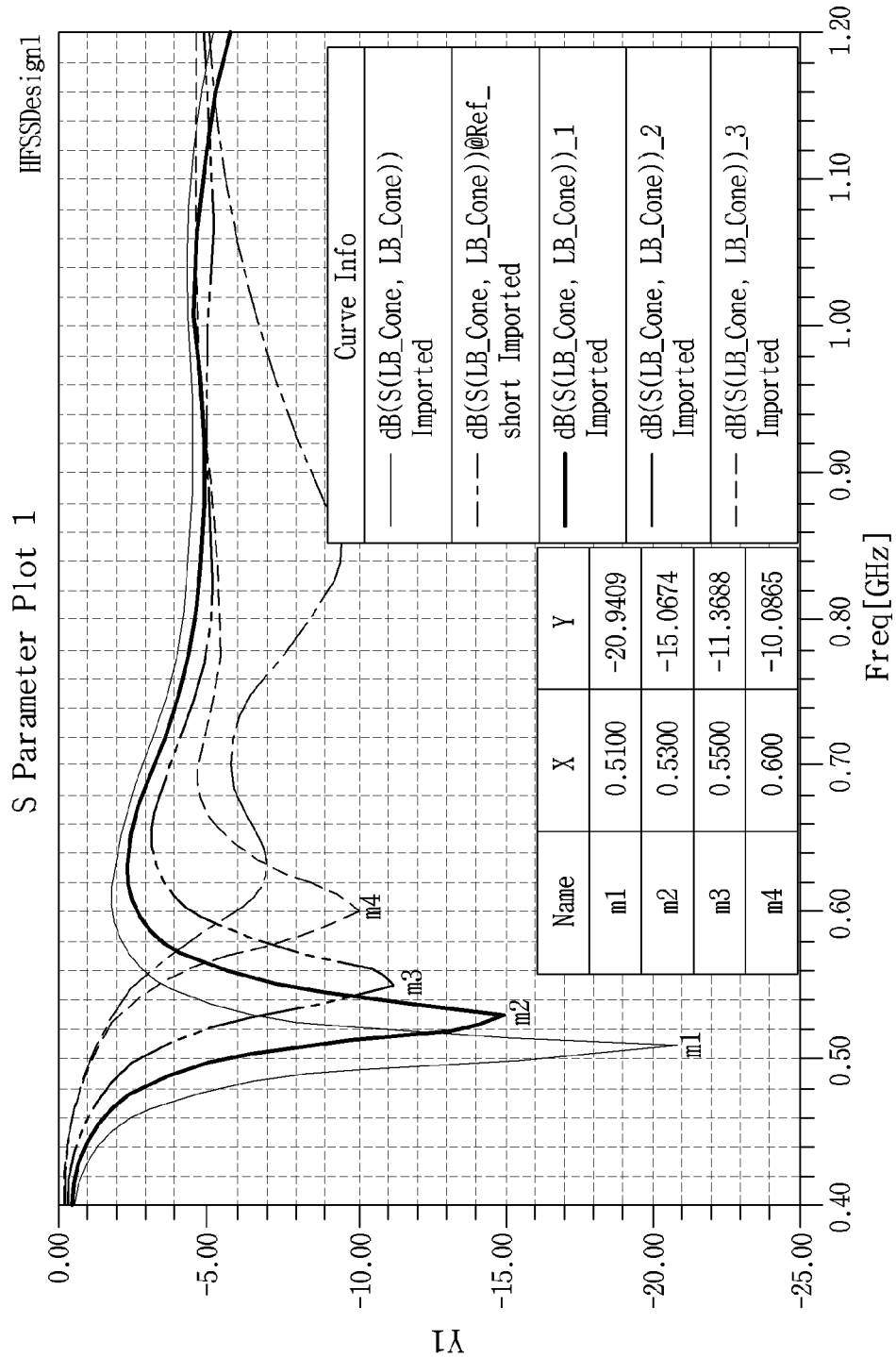
FIG. 13B is a view illustrating the VSWR result as the length of the extension part is decreased.

On the other hand, the bandwidth characteristic by the multi-resonance can be improved by reducing the length of the extension parts of the shorting bar SBT2 that includes the connection part, the extension parts, and the fastening parts. FIG. 13A is a view illustrating a case of changing the length of the extension portion according to one implementation. FIG. 13B is a view illustrating the VSWR result as the length of the extension portion decreases.

Referring to FIGS. 10A, 10B, and 13A, a second length of the extension part SB2 connected to the fastening part SB3 may be longer than a first length of the extension part SB2 connected to the connection part SB1. In this regard, the first length of the extension part SB2 connected to the connection part SB1 may be set to decrease by 6 mm, 12 mm, and 16.5 mm. Accordingly, the short bar SB may be configured to enable antenna bandwidth extension by the multi-resonance. Specifically, the resonant frequency of the first antenna 1100 can be shifted by adjusting the distance from the coupling patch S1 corresponding to a shorted patch to the screw boss and the length of the bending structure.

In this regard, referring to FIG. 13B, it can be seen that the resonant frequency decreases as the first length of the extension part SB2 connected to the connection part SB1 decreases by 6 mm, 12 mm, and 16.5 mm. Meanwhile, since the LB operating frequency of the first antenna 1100 is set to 600 MHz or more, the first length of the extension parts SB2 connected to the connection part SB1 needs to be reduced.

Therefore, the second length of the extension parts SB2 connected to the fastening parts SB3 may be longer than the first length of the extension parts SB2 connected to the connection part SB1, to improve the LB characteristics. Accordingly, the shorting bar SB in which the second length of the extension parts SB2 connected to the fastening parts SB3 is longer than the first length of the extension parts SB2 connected to the connection part SB1 can allow the antenna bandwidth extension by the multi-resonance.

Meanwhile, in the cone antenna structure including the radiator and the metal patch, the shorting structure may not be provided only on the metal patch. In this regard, the shorting structure may be used to minimize an antenna size and optimize a radiation pattern. To this end, the shorting structure may be arranged adjacent to the radiator. In this regard, FIG. 14 is a view a structure in which a shorting structure is disposed adjacent to an inverted-pyramidal radiator according to an example.

Figure 14:
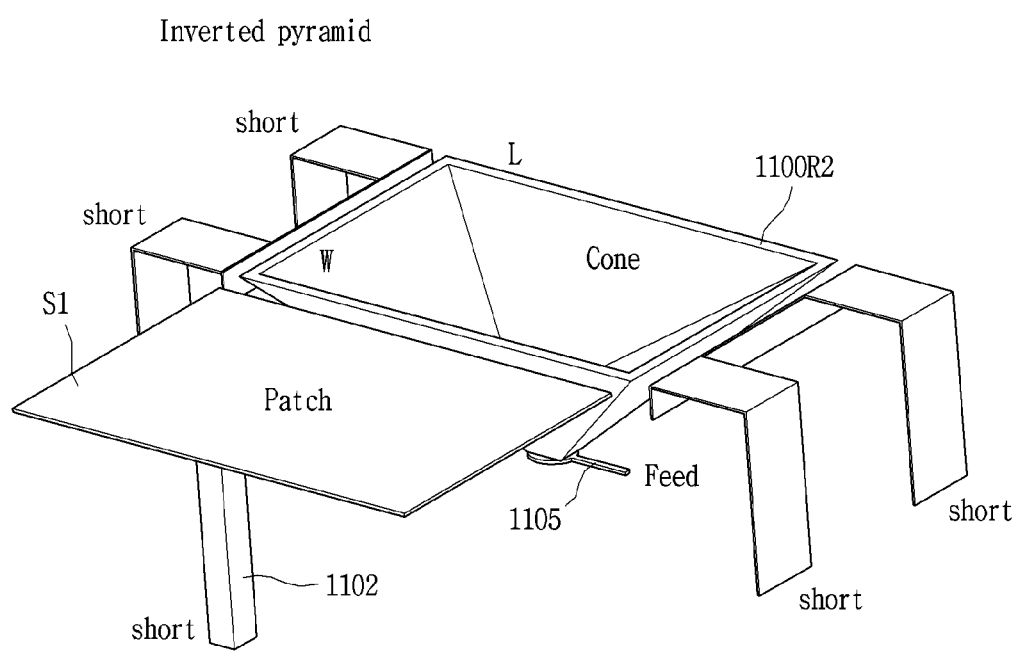
FIG. 14 is a view a structure in which a shorting structure is disposed adjacent to an inverted-pyramidal radiator according to an example.

Referring to FIG. 14, the shorting structure may be disposed on one side and another side of the inverted-pyramidal radiator 1100R2. In this regard, the shorting pin 1102 may be separately provided on a patch corresponding to the coupling patch. Meanwhile, the shorting structure short disposed on the one side and the another side of the inverted-pyramidal radiator 1100R2 may include four shorting strips connected to the lower substrate. In addition, the shorting structure short may further include extension parts orthogonally bent from the shorting strips, respectively. Also, the shorting structure short may further include connection parts configured to connect the extension parts.

As described above, the first antenna 1100 may be configured to operate in the low band LB. However, the present disclosure may not be limited thereto, and the first antenna 1100 may operate in the full band of the low band LB, the middle band MB, and the high band HB by the cone radiator 1100R or the pyramid radiator 1100R2 and the shorting bar Sb.

Meanwhile, the second antenna 1200 may be configured as a broadband antenna operating in the middle band MB and the high band HB. For example, the second antenna 1200 may include a plurality of cone antennas 1200-1 to 1200-4 including a cone radiator 1200R and a patch antenna 1201.

The plurality of cone antennas 1200-1 to 1200-4 may be implemented as 2×2 cone array antennas 1200-1 to 1200-4, but may not be limited thereto, and may be variously changed according to vehicle specifications or communication requirements. The 2×2 cone array antennas 1200-1 to 1200-4 may be disposed in a rotated state by predetermined angles with respect to one another. Specifically, the second cone antenna 1200-2 may be arranged in a rotated state by a predetermined angle to optimize isolation from the first cone antenna 1200-1. In detail, the second cone antenna 1200-2 may be arranged in the vertically symmetrical form with respect to the first cone antenna 1200-1.

The third cone antenna 1200-3 may be arranged in a rotated state by a predetermined angle to optimize isolation from the first cone antenna 1200-1. In detail, the third cone antenna 1200-3 may be arranged in the left-right symmetrical form with respect to the first cone antenna 1200-1.

The fourth cone antenna 1200-4 may be arranged in a rotated state by a predetermined angle to optimize isolation from the second cone antenna 1200-2. In detail, the fourth cone antenna 1200-4 may be arranged in the left-right symmetrical form with respect to the first cone antenna 1200-2.

In this case, each of the metal patches disposed adjacent to the first to fourth cone antennas 1200-1 to 1200-4 may be disposed only in a partial region at one side of the cone antenna. In this regard, the metal patch disposed only in the partial region may be a cut rectangular patch disposed only in a region between the adjacent outer rims 1103. Such cut rectangular patches can reduce the interference between the adjacent cone antennas.

The baseband processor 1400 can thus perform MIMO through the plurality of cone antennas 1200-1 to 1200-4 corresponding to the second antenna 1200. In this regard, the second antenna 1200 may include the plurality of cone antennas 1200-1 to 1200-4 each including a cone radiator and a patch antenna. The baseband processor 1400 may perform MIMO through the first antenna 1100 and at least one of the plurality of cone antennas 1200-1 to 1200-4.

Meanwhile, the baseband processor 1400 may be configured to perform carrier aggregation (CA) in addition to MIMO. Accordingly, the baseband processor 1400 may perform CA by receiving the first signal of the first frequency band through the first antenna 1100 and the second signal of the second frequency band through the second antenna 1200. Also, the baseband processor 1400 may perform CA by transmitting the first signal of the first frequency band through the first antenna 1100 and the second signal of the second frequency band through the second antenna 1200.

On the other hand, separately from the first to fourth cone antennas 1200-1 to 1200-4, a multi-wing cone antenna that can operate in all of the low band LB, the middle band MB, and the high band HB may be disposed between the first antenna 1100 and the second antenna 1200.

In this regard, the term "multi-wing cone antenna" means an antenna in which the number of outer rims of the cone radiator connected to the metal structure of the upper substrate is plural, preferably, three or more. As illustrated in FIGS. 8 and 10A, the first antenna can operate even in the low band LB in addition to the middle band MB and the high band HB by the multi-wing cone antenna with 6 or more outer rims (wings).

Accordingly, the first antenna 1100 and the multi-wing cone antenna can perform MIMO in the first frequency band, which is the LB band. On the other hand, the second antenna 200 and the multi-wing cone antenna can perform MIMO in the second frequency band, which is the MB band and the HB band.

Meanwhile, when it is necessary to simultaneously receive information from various entities such as an adjacent vehicle, RSU, or base station for autonomous driving, etc., a broad reception can be allowed through MIMO. Accordingly, the vehicle can receive different information from various entities at the same time to improve a communication capacity. This can improve the communication capacity of the vehicle through the MIMO without a bandwidth extension.

Alternatively, the vehicle may simultaneously receive the same information from various entities, so as to improve reliability for surrounding information and reduce latency. Accordingly, URLLC (Ultra Reliable Low Latency Communication) can be performed in the vehicle and the vehicle can operate as a URLLC UE. To this end, a base station performing scheduling may preferentially allocate a time slot for the vehicle operating as the URLLC UE. For this, some of specific time-frequency resources already allocated to other UEs may be punctured.

As aforementioned, the first antenna 1100 may operate in the full band of the low band LB, the middle band MB, and the high band HB by the cone radiator 1100R or the pyramid radiator 1100R2 and the shorting bar Sb. Here, the low band LB may be referred to as the first frequency band and the middle band MB and the high band HB may be referred to as the second frequency band. Accordingly, the baseband processor 1400 may perform MIMO through the first antenna 1100 and at least one of the plurality of cone antennas 1200-1 to 1200-4 in the second frequency band. Therefore, MIMO can be performed using different types of antennas spaced apart from each other by a sufficient distance. This can improve isolation between the first and second signals within the same band.

The first antenna 1100 of the antenna system may operate as a radiator in the low band LB, which is the first frequency band. Also, the second antenna 1200 may operate as a radiator in the second frequency band higher than the first frequency band. Accordingly, the baseband processor 1400 may control the transceiver circuit 1250 to receive the first signal of the first frequency band through the first antenna 1100 and the second signal of the second frequency band through the second antenna 1200. Therefore, the baseband processor 1400 can perform carrier aggregation (CA) through a band in which the first frequency band and the second frequency band are combined with each other. When it is necessary to receive a large amount of data for autonomous driving and the like, a broadband reception can be allowed through the CA.

Accordingly, eMBB (Enhanced Mobile Broad Band) communication can be performed in the vehicle and the vehicle can operate as an eMBB UE. To this end, a base station performing scheduling may preferentially allocate broadband frequency resources for the vehicle operating as the eMBB UE. For this purpose, CA may be performed on extra frequency bands except for frequency resources already allocated to other UEs.

The foregoing description has been given of the broadband antenna system mounted in the vehicle according to one aspect. Hereinafter, a vehicle equipped with a broadband antenna system according to another aspect will be described. In this regard, the foregoing description of the antenna system may be applied, and the description of the vehicle in which the antenna system is mounted may also be applied to the aforementioned antenna system.

The broadband antenna system according to the present disclosure may be mounted in the vehicle in the structure illustrated in FIGS. 2A to 2C. That is, the broadband antenna system mounted to the vehicle may be mounted on a roof of the vehicle, inside the roof, or inside a roof frame, as illustrated in FIGS. 2A to 2C.

Figure 15:
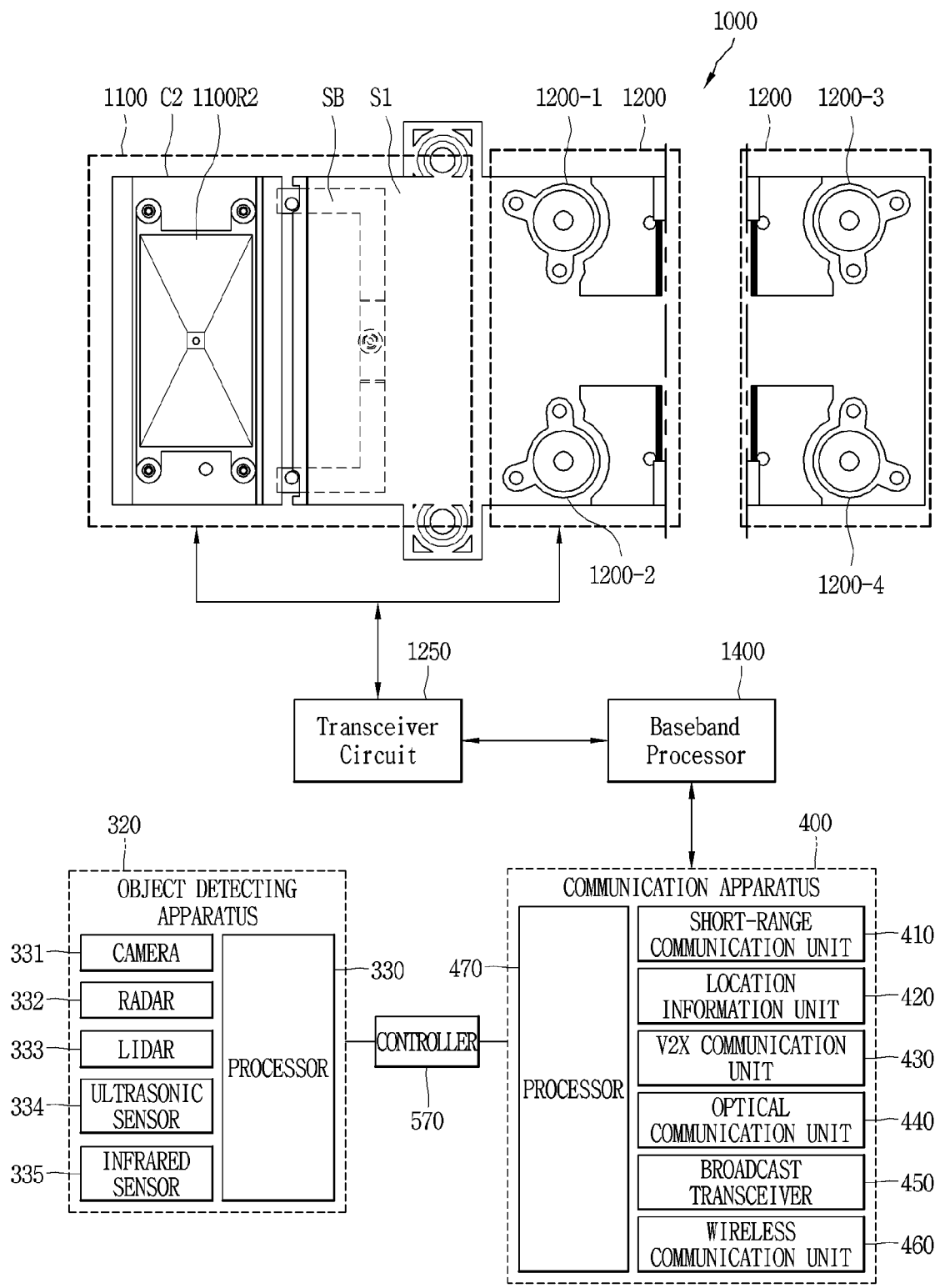
FIG. 15 is a block diagram illustrating a broadband antenna system and a vehicle in which the antenna system is mounted according to the present disclosure.

FIG. 15 is a block diagram illustrating a broadband antenna system and a vehicle in which the antenna system is mounted according to the present disclosure. In this regard, FIG. 15 illustrates a part of the broadband antenna system. The second antenna 1200 may include the plurality of cone antennas 1200-1 and 1200-2. In this case, the second antenna 1200 may further include two more cone antennas to perform MIMO in addition to the plurality of cone antennas 1200-1 and 1200-2. Accordingly, the four cone antennas may be referred to as the first to fourth cone antennas 1200-1 to 1200-4, respectively.

Referring to FIG. 15, the vehicle 300 in which the broadband antenna system is mounted may have the antenna system 1000 mounted thereto. The antenna system 1000 may perform short-range communication, wireless communication, V2X communication, and the like by itself or through the communication apparatus 400. To this end, the baseband processor 1400 may be configured to receive signals from or transmit signals to adjacent vehicles, RSUs, and base stations through the antenna system 1000.

Alternatively, the baseband processor 1400 may be configured to receive signals from or transmit signals to adjacent vehicles, RSUs, and base stations through the communication apparatus 400. Here, the information related to adjacent objects may be acquired through the object detecting apparatus such as the camera 331, the radar 332, the LiDar 333, and the sensors 334 and 335 of the vehicle 300. Alternatively, the baseband processor 1400 may be configured to receive signals from or transmit signals to adjacent vehicles, RSUs, and base stations through the communication apparatus 400 and the antenna system 1000.

Meanwhile, referring to FIGS. 1 to 15, the vehicle 300 including the antenna system 1000 may include the first antenna 1100, the second antenna 1200, the transceiver circuit 1250, and the baseband processor 1400.

The first antenna 1100 may include the radiator 1100R2, the coupling patch S1, the stack patch C2, and the shorting bar SB, SBT2. The radiator 1100R2 may allow a signal applied through the lower aperture to be transmitted through the upper aperture. The coupling patch S1 may be disposed on the upper substrate to be spaced apart from the upper aperture by a predetermined distance so that a signal transmitted to the upper aperture can be coupled. The stack patch C2 may be disposed to be spaced apart from the upper aperture by a predetermined height so that a signal transmitted to the upper aperture is coupled. The stack patch C2 may also be disposed on the upper substrate to be spaced apart from the coupling patch S1 by a predetermined distance. Also, the shorting bar SB, SBT2 may be connected in surface-contact with the coupling patch S1 and connect the ground layer of the lower substrate.

The second antenna 1200 may be disposed in the antenna system separately from the first antenna 1100. The transceiver circuit 1250 may be controlled to radiate a signal through at least one of the first antenna 1100 and the second antenna 1200. The baseband processor 1400 may perform communication with at least one of an adjacent vehicle, a Road Side Unit (RSU), and a base station through the transceiver circuit 1250.

On the other hand, the shape of the radiator 1100R2 may not be limited to the inverted-pyramidal radiator having a rectangular aperture. The radiator may be implemented as a cone radiator having a circular aperture as illustrated in FIG. 7A. Accordingly, the upper and lower apertures of the radiator may be formed in a circular, oval, or polygonal shape. In this regard, a signal applied from a feeding line through the lower aperture may be transmitted to the upper aperture through the inside of the radiator and coupled to the stack patch C2 corresponding to a metal patch.

The radiator 1100R2 may allow a signal applied through the lower aperture to be transmitted through the upper aperture. In this regard, the upper aperture and the lower aperture may be formed in a rectangular shape, and the radiator 1100R2 may be configured as a pyramidal radiator in which the upper aperture is larger than the lower aperture in size. In this case, the coupling patch S1 may have a rectangular shape.

The coupling patch S1 may be disposed on the upper substrate to be spaced apart from the upper aperture by a predetermined distance so that a signal transmitted to the upper aperture can be coupled. In addition, the stack patch C2 may be disposed on the upper substrate to be spaced apart from the coupling patch S1 by a predetermined distance. In this case, the stack patch C2 may be disposed to be spaced apart from the upper aperture by a predetermined height so that a signal transmitted to the upper aperture can be coupled. Accordingly, the signal radiated through the upper aperture of the radiator 1100R2 can be coupled to the upper stack patch C2. In addition, the first antenna 1100 can operate in a wider frequency band through the coupling patch S1 spaced apart from the stack patch C2 by the predetermined distance.

The feeder 1105 may be disposed on the front surface of the lower substrate to transfer a signal to the radiator 1100R2. The feeder 1105 may be connected to the transceiver circuit 1250, and a matching circuit for impedance matching between the feeder 1105 and the transceiver circuit 1250 may be disposed.

Meanwhile, the shorting bar SB may be connected in surface-contact with the coupling patch S1 and connect the ground layer of the lower substrate. Specifically, the shorting bar SB may include a connection part SB1 and an extension part SB2. The connection part SB1 may be connected to one region inside the coupling patch S1. In addition, the extension part SB2 may be bent from the connection part SB1 by a predetermined angle. In this case, the terminated portion of the extension part SB2 may be connected to the ground layer of the lower substrate.

The second antenna 1200 may be disposed in the antenna system separately from the first antenna. In this regard, the first antenna 1100 may operate as a radiator in the low band LB that is the first frequency band, and the second antenna 1200 may operate as a radiator in the second frequency band that is higher than the first frequency band. However, in the structure of the inverted-pyramidal radiator 1100R2, the first antenna 1100 may operate as a radiator in the both the low band LB that is the first frequency band and the second frequency band.

As aforementioned, the second antenna 1200 may be configured as a broadband antenna operating in the middle band MB and the high band HB. For example, the second antenna 1200 may include the plurality of cone antennas 1200-1 to 1200-4 including the cone radiator 1200R and the patch antenna 1201.

The plurality of cone antennas 1200-1 to 1200-4 may be implemented as 2×2 cone array antennas 1200-1 to 1200-4, but may not be limited thereto, and may be variously changed according to vehicle specifications or communication requirements. The 2×2 cone array antennas 1200-1 to 1200-4 may be disposed in a rotated state by predetermined angles with respect to one another. Specifically, the second cone antenna 1200-2 may be arranged in a rotated state by a predetermined angle to optimize isolation from the first cone antenna 1200-1. In detail, the second cone antenna 1200-2 may be arranged in the vertically symmetrical form with respect to the first cone antenna 1200-1.

The third cone antenna 1200-3 may be arranged in a rotated state by a predetermined angle to optimize isolation from the first cone antenna 1200-1. In detail, the third cone antenna 1200-3 may be arranged in the left-right symmetrical form with respect to the first cone antenna 1200-1.

The fourth cone antenna 1200-4 may be arranged in a rotated state by a predetermined angle to optimize isolation from the second cone antenna 1200-2. In detail, the fourth cone antenna 1200-4 may be arranged in the left-right symmetrical form with respect to the first cone antenna 1200-2.

In this case, each of the metal patches disposed adjacent to the first to fourth cone antennas 1200-1 to 1200-4 may be disposed only in a partial region at one side of the cone antenna. In this regard, the metal patch disposed only at the partial region may be a cut rectangular patch disposed only in a region between the adjacent outer rims 1103. Such cut rectangular patches can reduce the interference between the adjacent cone antennas.

On the other hand, separately from the first to fourth cone antennas 1200-1 to 1200-4, the multi-wing cone antenna that can operate in all of the low band LB, the middle band MB, and the high band HB may be disposed between the first antenna 1100 and the second antenna 1200.

In this regard, the term "multi-wing cone antenna" means an antenna in which the number of outer rims of the cone radiator connected to the metal structure of the upper substrate is plural, preferably, three or more. As illustrated in FIG. 8, the multi-wing cone antenna with 6 or more outer rims can operate as an antenna even in the low band LB in addition to the middle band MB and the high band HB.

Accordingly, the first antenna 1100 and the multi-wing cone antenna can perform MIMO in the first frequency band, which is the LB band. On the other hand, the second antenna 1200 and the multi-wing cone antenna can perform MIMO in the second frequency band, which is the MB band and the HB band.

The baseband processor 1400 may control the transceiver circuit 1250 to receive the first signal of the first frequency band through the first antenna 1100 and the second signal of the second frequency band through the second antenna 1200. Therefore, the baseband processor 1400 can perform carrier aggregation (CA) through the first frequency band and the second frequency band.

The transceiver circuit 1250 may be controlled to radiate a signal through at least one of the first antenna and the second antenna. The baseband processor 1400 may perform communication with at least one of an adjacent vehicle, a Road Side Unit (RSU), and a base station through the transceiver circuit 1250.

Meanwhile, the baseband processor 1400 may be configured to perform carrier aggregation (CA) in addition to MIMO. In this regard, the first antenna 1100 may operate as a radiator in the low band LB that is the first frequency band and the second frequency band that is higher than the first frequency band. Also, the second antenna 1200 may operate as a radiator in the second frequency band. Accordingly, the baseband processor 1400 may perform CA by receiving the first signal of the first frequency band through the first antenna 1100 and the second signal of the second frequency band through the second antenna 1200. Also, the baseband processor 1400 may perform CA by transmitting the first signal of the first frequency band through the first antenna 1100 and the second signal of the second frequency band through the second antenna 1200.

The foregoing description has been given of the antenna system having the plurality of antennas including the broadband antenna, and the vehicle having the same. Hereinafter, technical effects of an antenna system having a plurality of antennas including a broadband antenna, and a vehicle having the same will be described.

According to the present disclosure, a broadband antenna structure that can cover both a 4G band and a 5G band in an antenna system mounted in a vehicle can be provided.

In addition, various communication systems can be supported by implementing a low band (LB) antenna and other antennas in a single antenna module.

An antenna that covers a full band from 600 MHz to 3.8 GHz can be provided through an inverted-pyramidal radiator having a structure optimized to have different resonance lengths.

A structure for mounting an antenna system that can operate in a wide frequency band can be provided.

According another aspect, various antenna structures that can operate in the low band LB can be provided by coupling a shorting bar as well as a shorting pin to a metal plate.

The antenna system can be optimized with different antennas in the low band LB and other bands. This can result in arranging the antenna system with optimal configuration and performance in a roof frame of the vehicle.

The antenna system of the vehicle can implement MIMO and diversity operations using a plurality of antennas in specific bands.

According to another aspect, antenna performance optimized according to various structures that can operate in the low band LB can be provided by coupling a shorting bar and a metal path in various structures and shapes.

Further scope of applicability of the present disclosure will become apparent from the following detailed description. It should be understood, however, that the detailed description and specific examples, such as the preferred embodiment of the invention, are given by way of illustration only, since various changes and modifications within the spirit and scope of the invention will be apparent to those skilled in the art.

In relation to the aforementioned present disclosure, design and operations of a plurality of antennas of an antenna system mounted in a vehicle and a configuration performing the control of those antennas can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller of the terminal. Therefore, the detailed description should not be limitedly construed in all of the aspects, and should be understood to be illustrative. Therefore, all changes and modifications that fall within the metes and bounds of the claims, or equivalents of such metes and bounds are therefore intended to be embraced by the appended claims.

The invention claimed is:

1. An antenna system mounted in a vehicle, the system comprising:
   a radiator configured to transmit a signal applied through a lower aperture to an upper aperture;
   a coupling patch disposed on an upper substrate to be spaced apart from the upper aperture so that the signal transmitted to the upper aperture is coupled;
   a first antenna including a shorting bar connected in surface-contact with the coupling patch and configured to connect a ground layer of a lower substrate;
   a second antenna disposed in the antenna system, separately from the first antenna; and
   a transceiver circuit configured to control a signal to be radiated through at least one of the first antenna and the second antenna,
   wherein the upper aperture and the lower aperture have a rectangular shape, and the radiator is configured as a pyramidal radiator in which the upper aperture is larger than the lower aperture in size, and
   wherein the coupling patch has a rectangular shape.

2. The antenna system of claim 1, wherein the upper aperture and the lower aperture are formed in a circular, oval, or polygonal shape, and
   wherein a signal applied from a feeding line through the lower aperture is transmitted to the upper aperture through an inside of the radiator so as to be coupled to a stack patch corresponding to a metal patch.

3. The antenna system of claim 1, further comprising a stack patch disposed to be spaced apart from the upper aperture by a predetermined height so that the signal transmitted to the upper aperture is coupled, the stack patch disposed on the upper substrate to be spaced apart from the coupling patch by a predetermined distance.

4. The antenna system of claim 1, wherein the shorting bar comprises:
   a connection part connected to one region of an inside of the coupling patch; and
   extension parts bent from the connection part at predetermined angles, and
   wherein terminated portions of the extension parts are connected to the ground layer of the lower substrate.

5. The antenna system of claim 4, wherein a second length of the extension part connected to a fastening part is longer than a first length of the extension part connected to the connection part, so that an antenna bandwidth can extend by multi-resonance.

6. The antenna system of claim 4, wherein the connection part is disposed in an edge region corresponding to one end portion of the coupling patch, so that the first antenna resonates up to a first frequency band that is a lower band (LB).

7. The antenna system of claim 4, wherein a stack patch disposed on an upper portion of the radiator is configured as a first metal plate, and the shorting bar is connected to a screw boss formed at one point in a second metal plate corresponding to the coupling patch.

8. The antenna system of claim 4, wherein the connection part of the shorting bar is formed by a predetermined length up to a position connected to the lower substrate, and
   wherein the extension parts of the shorting bar extend orthogonally on the same plane as the connection part, and extend vertically downward from the orthogonally extended end portions to be coupled to fastening parts fastened to the ground layer of the lower substrate.

9. The antenna system of claim 1, wherein outer rims integrally formed with the pyramidal radiator and the upper substrate are connected by screws, and the first antenna resonates at multiple frequencies by a multi-wing structure constituting the outer rims.

10. The antenna system of claim 9, wherein the multi-wing structure comprises four wings integrally formed with a rim of the upper aperture of the pyramidal radiator at upper left, lower left, upper right, and lower right of the pyramidal radiator, so that the first antenna resonates at multiple frequencies.

11. The antenna system of claim 9, wherein the multi-wing structure comprises six wings integrally formed with a rim of the upper aperture of the pyramidal radiator at upper left, left center, lower left, upper right, right center, and lower right of the pyramidal radiator, so that the first antenna resonates at more frequencies, compared to the multi-wing structure with four wings.

12. The antenna system of claim 11, wherein the multi-wing structure having the six wings is configured such that a height of a coupling structure between the outer rims and the upper substrate increases as the radiator is adjacent to a second metal plate as the coupling patch, and
   wherein a first metal plate corresponding to a metal path on an upper portion of the radiator is disposed at a predetermined inclination as the height of the coupling structure increases.

13. The antenna system of claim 1, wherein the second antenna comprises a plurality of cone antennas each including a cone radiator and a patch antenna,
   wherein the antenna system further comprises a baseband processor configured to perform multi-input/multi-output (MIMO) through the plurality of cone antennas, and
   wherein the baseband processor performs MIMO through the first antenna and at least one of the plurality of cone antennas.

14. The antenna system of claim 1, wherein the first antenna operates as a radiator in a low band that is a first frequency band and a second frequency band higher than the first frequency band, and the second antenna operates as a radiator in the second frequency band, and
   wherein the antenna system further comprises a baseband processor configured to perform carrier aggregation (CA) by receiving a first signal of the first frequency band through the first antenna and a second signal of the second frequency band through the second antenna.

15. A vehicle having an antenna system, the vehicle comprising:
   a radiator configured to transmit a signal applied through a lower aperture to an upper aperture;
   a coupling patch disposed on an upper substrate to be spaced apart from the upper aperture so that the signal transmitted to the upper aperture is coupled;
   a first antenna including a shorting bar connected in surface-contact with the coupling patch and configured to connect a metal path and a ground layer of a lower substrate;

a second antenna disposed in the antenna system, separately from the first antenna;

a transceiver circuit configured to control a signal to be radiated through at least one of the first antenna and the second antenna; and a baseband processor configured to communicate with at least one of an adjacent vehicle, a Road Side Unit (RSU) and a base station through the transceiver circuit, wherein the upper aperture and the lower aperture have a rectangular shape, and the radiator is configured as a pyramidal radiator in which the upper aperture is larger than the lower aperture in size, and wherein the coupling patch has a rectangular shape.

16. The vehicle of claim 15, further comprising a stack patch disposed to be spaced apart from the upper aperture by a predetermined height so that the signal transmitted to the upper aperture is coupled, the stack patch disposed on the upper substrate to be spaced apart from the coupling patch by a predetermined distance.

17. The vehicle of claim 16, wherein the first antenna operates as a radiator in a low band that is a first frequency band and a second frequency band higher than the first frequency band, and the second antenna operates as a radiator in the second frequency band, and wherein the baseband processor is configured to perform carrier aggregation (CA) by receiving a first signal of the first frequency band through the first antenna and a second signal of the second frequency band through the second antenna.

18. The vehicle of claim 15, wherein the shorting bar comprises:

a connection part connected to one region of an inside of the coupling patch; and extension parts formed by being bent from the connection part at a predetermined angle, and wherein terminated portions of the extension parts are connected to the ground layer of the lower substrate.

* * * * *